(12) United States Patent
Aoki et al.

(10) Patent No.: US 6,219,493 B1
(45) Date of Patent: Apr. 17, 2001

(54) ELECTRONIC FLASH DEVICE OF A SEPARATE EXCITATION OSCILLATING TYPE

(75) Inventors: Toshiyuki Aoki; Teruhiko Yasui, both of Hachioji (JP)

(73) Assignee: Konica Corporation, Tokyo (JP)

( * ) Notice: Subject to any disclaimer, the term of this patent is extended or adjusted under 35 U.S.C. 154(b) by 0 days.

(21) Appl. No.: 09/376,371

(22) Filed: Aug. 18, 1999

(30) Foreign Application Priority Data

Aug. 19, 1998 (JP) .................................................. 10-232604
Apr. 28, 1999 (JP) .................................................. 11-122871

(51) Int. Cl.$^7$ .................................................. G03B 15/05
(52) U.S. Cl. .................................................. 396/206
(58) Field of Search .................................... 396/205, 206; 315/241 P

(56) References Cited

U.S. PATENT DOCUMENTS 4,272,806 * 6/1981 Metzger ........................... 315/241 P
5,068,575 * 11/1991 Dunsmore et al. ........... 315/241 P X
5,485,361 * 1/1996 Sokal ............................ 315/241 P X

FOREIGN PATENT DOCUMENTS 7-22189   1/1995 (JP) .

* cited by examiner

Primary Examiner—W. B. Perkey
(74) Attorney, Agent, or Firm—Finnegan, Henderson, Farabow, Garrett, & Dunner, L.L.P.

(57) ABSTRACT

An electronic flash charger having an electronic flash charging circuit of a separate excitation oscillating. The charger includes: a flyback transformer, having at least a primary coil and a secondly coil; a switching element for turning on or off electric power, to be supplied to the primary coil, based on control signals supplied to a control input terminal; a rectifying diode for rectifying a flyback pulse generated on the secondly coil when the switching element is changed from ON state, that the electric power is turned on, to OFF state, that the electric power is turned off; a main capacitor for charging a current rectified by the rectifying diode; and an oscillation controller for generating control signals for changing at least one of time spans of ON state and OFF state of the switching element in accordance with a period from generation to extinction of the flyback pulse generated on the secondly coil, and for supplying the control signals to the control input terminal of the switching element.

28 Claims, 23 Drawing Sheets

| TIME ELAPSED ( s ) | ON TIME (μs) | OFF TIME (μs) |
|---|---|---|
| 0 ~ | 10 | 50 |
| 0.2 ~ | 10 | 20 |
| 0.5 ~ | 10 | 10 |
| 0.9 ~ | 10 | 8 |
| 1.4 ~ | 10 | 7 |

FIG. 16 (a)
AT NORMAL VOLTAGE

| TIME ELAPSED (s) | ON TIME (µs) | OFF TIME (µs) |
|---|---|---|
|  | 10 | 50 |
| 0 ~ | 10 | 50 |
| 0.2 ~ | 10 | 20 |
| 0.5 ~ | 10 | 10 |
| 0.9 ~ | 10 | 8 |
| 1.4 ~ | 10 | 7 |

FIG. 16 (b)
AT LOW VOLTAGE

| TIME ELAPSED (s) | ON TIME (µs) | OFF TIME (µs) |
|---|---|---|
| 0 ~ | 10 | 50 |
| 0.2 ~ | 10 | 50 |
| 0.5 ~ | 10 | 20 |
| 0.9 ~ | 10 | 10 |
| 1.4 ~ | 10 | 8 |
|  | 10 | 7 |

FIG. 16 (c)
3V LITHIUM

| BATTERY VOLTAGE (V) | duty (%) |
|---|---|
| 2.4 ~ | 40 |
| 2.5 ~ | 50 |
| 2.6 ~ | 55 |
| 2.8 ~ | 65 |

| CHARGING VOLTAGE (V) | ON TIME (μs) | OFF TIME (μs) |
|---|---|---|
| 0 ~ | 10 | 50 |
| 50 ~ | 10 | 20 |
| 100 ~ | 10 | 10 |
| 130 ~ | 10 | 8 |
| 200 ~ | 10 | 7 |

FIG. 22 (a)

| TIME ELAPSED (s) | ON TIME (μs) | OFF TIME (μs) |
|---|---|---|
|  | 10 | 50 |
| 0 ~ | 10 | 50 |
| 50 ~ | 10 | 20 |
| 100 ~ | 10 | 10 |
| 130 ~ | 10 | 8 |
| 200 ~ | 10 | 7 |

FIG. 22 (b)

| CHARGING VOLTAGE (V) | ON TIME (μs) | OFF TIME (μs) |
|---|---|---|
| 0 ~ | 10 | 50 |
| 50 ~ | 10 | 50 |
| 100 ~ | 10 | 20 |
| 130 ~ | 10 | 10 |
| 200 ~ | 10 | 8 |
|  | 10 | 7 |

FIG. 23 (a)

| TIME ELAPSED (s) | ON TIME (µs) | OFF TIME (µs) |
|---|---|---|
|  | 10 | 50 |
| 0 ~ | 10 | 50 |
| 0.2 ~ | 10 | 20 |
| 0.5 ~ | 10 | 10 |
| 0.9 ~ | 10 | 8 |
| 1.4 ~ | 10 | 7 |

FIG. 23 (b)

| TIME ELAPSED (s) | ON TIME (µs) | OFF TIME (µs) |
|---|---|---|
| 0 ~ | 10 | 50 |
| 0.2 ~ | 10 | 50 |
| 0.5 ~ | 10 | 20 |
| 0.9 ~ | 10 | 10 |
| 1.4 ~ | 10 | 8 |
|  | 10 | 7 |

| EMISSION TIME (μs) | MAIN CAPACITOR RESIDUAL VOLTAGE (V) | INITIAL VALUE OF TIMER TO BE SET (s) |
|---|---|---|
| 0 | 330 | 4.0 |
| 30 | 300 | 3.5 |
| 60 | 250 | 2.0 |
| 200 | 150 | 1.0 |
| 2000 | 50 | 0.2 |

FIG. 26

| TIME ELAPSED ( s ) | ON TIME (μs) | OFF TIME (μs) |
|---|---|---|
| 0 ~ | 10 | 50 |
| 0.2 ~ | 10 | 50 |
| 0.5 ~ | 10 | 20 |
| 0.9 ~ | 10 | 10 |
| 1.4 ~ | 10 | 8 |
| 4.0 ~ | 10 | 20 |

FIG. 27

| TIME ELAPSED ( s ) | ON TIME (μs) | OFF TIME (μs) |
|---|---|---|
| 0 ~ | 10 | 50 |
| 0.2 ~ | 10 | 50 |
| 0.5 ~ | 10 | 20 |
| 0.9 ~ | 10 | 10 |
| 1.4 ~ | 10 | 8 |
| 4.0 ~ | 10 | 20 |
| 6.0 ~ | 10 | 30 |
| 10.0 ~ | 10 | 50 |

ELECTRONIC FLASH DEVICE OF A SEPARATE EXCITATION OSCILLATING TYPE

The present invention relates to an electronic flash device which controls an illuminating unit for a camera (electronic flash) in the course of photographing.

When a type of the electronic flash device is classified roughly, it includes the following.

Classification by an oscillating type

Self-excitation oscillating type: A type wherein a circuit which oscillates by it self is structured in a charging circuit.

Separate excitation oscillating type: A type wherein oscillation control signals are given to an oscillating element from the outside.

Classification by a type of voltage step up

Forward Type:

A type wherein voltage impressed on a primary coil of a transformer is stepped up in accordance with the turns ratio of the primary coil to a secondary coil, and is outputted on the secondary coil.

Flyback Type:

A type wherein backward voltage which is generated when an electric current that is running through the primary coil is interrupted, is generated on the secondary coil.

Therefore, those wherein the oscillating type one and the step-up type one stated above are combined can be considered as the electronic flash device.

Incidentally, conventional electronic flash devices employ a step up circuit which is of a self-excitation oscillating type and of a forward type (hereinafter referred to as self-exciting forward type).

In the electronic flash device of this self-exciting forward type, oscillating operations are stable despite a relatively simple circuit structure, because of the structure wherein a circuit for conducting oscillating operations is formed in the electronic flash device, and a charging current to a main capacitor flowing through the secondly coil is fed back to a base current for an oscillation transistor (bipolar transistor) connected to the primary coil in series.

In the step up circuit of the self-exciting forward type, the circuit automatically conducts the step up control wherein when the charging voltage is low, a large amount of currents are made to flow through the primary coil to conduct rapid step up operation, while when the charging voltage comes to the level which is close to the supply voltage multiplied by the turns ratio, the current to be consumed is changed to one which is marginally sufficient to maintain oscillating operations. Therefore, the step up circuit of the self-exciting forward type is generally used frequently for the electronic flash device which is not provided with CPU.

Even after being provided on a CPU-controlled camera, the step up circuit of the self-exciting forward type has been used generally because of the reason of the simple control such as changing a signal for start charging from OFF to ON in the case of start charging, and just changing a signal for start charging from ON to OFF in the case of inputting a charging completion signal and thereby stopping the charging.

On the other hand, a step up circuit of a separate excitation flyback type which is a combination of separate excitation oscillating and a flyback type is provided with a characteristic that an electric current to be consumed can be controlled, because behavior of an electric current flowing through the primary coil is constant independently of charging voltage due to the flyback type actions wherein a current is made to flow through the primary coil to accumulate energy in a transformer, and a flyback pulse generated in the secondly coil instantaneously when the current flowing through the primary coil is cut off is accumulated in the main capacitor.

Further, since a switching element connected to the primary coil can be turned on and turned off from the outside, there is provided a characteristic of separate excitation oscillating control that it is possible to prevent release of waste energy by controlling a switching element to turn it on or turn it off so that heat generation caused by current saturation of the switching element, magnetic saturation of the transformer and by over-current.

Since both characteristics stated above are provided, it is possible to charge an electronic flash at high conversion efficiency in a stable way from the start of charging to the end thereof, namely to make the battery life longer, only by supplying relatively simple oscillation control signals having constant duty and frequency, which is an advantage.

In this flyback system, however, the time for flyback pulses to be generated varies greatly depending on charging voltage of the main capacitor connected. Therefore, it is not possible to input a large amount of electric power into the primary coil by utilizing the feed back and thereby to enhance the charging speed, which is different from the forward type. Further, in this flyback system, it is not possible, due to the repeated operations wherein energy accumulated while an oscillation transistor is kept to be on is released when the oscillation transistor is turned off, to enhance the duty of the time through which the charging current flows, resulting in a disadvantage that a period of time for charging is longer, which is different from the forward type.

It is not preferable that the charging time for electronic flash of a camera is long in spite of an advantage that a current consumed is constant and a conversion efficiency is high as stated above. The charging circuit for electronic flash of this separate excitation flyback type is disclosed in TOKKAIHEI No. 7-22189, for example, but there is no consideration to shorten the charging time. Therefore, the charging circuit of the separate excitation flyback type has not been used.

SUMMARY OF THE INVENTION

The invention has been achieved in view of the technical problems stated above, and its first object is to provide an electronic flash device and camera which can charge at high speed while conducting step up operations at high conversion efficiency.

Now, if the time for an oscillation transistor to be turned off is set to the time for a flyback pulse to be generated which is near the completion of charging where charging voltage is high and the time for the flyback pulse to be generated is short, for the purpose of shortening the charging time, when charging voltage of the main capacitor immediately after the start of charging is low, the oscillation transistor is undesirably turned on while a charging current is still flowing to the main capacitor where flyback pulses are being generated, and a current is forced to start flowing to the primary coil. Under this condition, there is generated phenomena that an unexpected excessive current flows through the primary coil, and conversion efficiency for charging is lowered.

Therefore, the time for the oscillation transistor to be turned off needs to be set in synchronization with the timing wherein charging voltage of the main capacitor is low and the time for flyback pulses to be generated is long, resulting in generation of the so-called "idle time" which contributes neither to accumulation of energy of a transformer nor to charging on the main capacitor caused by generation of flyback pulses, on the point of completion of charging. For this reason, there has been disadvantage that the charging time is made longer.

It is not preferable that the charging time for electronic flash of a camera is long in spite of the merit that a current to be consumed for charging can be controlled and conversion efficiency is high. The electronic flash device of this separate excitation flyback type is disclosed in TOKKAIHEI No. 7-22189, for example, but there is no consideration to shorten the charging time. Therefore, the charging circuit of the separate excitation flyback type has not been put to practical use.

It is known that an electromotive force of a battery with less remaining life and of a battery under low temperature is lowered. If it is tried to draw out a large amount of current for shortening the charging time when charging an electronic flash device with such battery, it results in a rapid drop of battery voltage, causing longer charging time on the contrary and a problem of shortening of battery life. In addition to the foregoing, when ambient temperature is high, or when the oscillation transistor temperature rises without balancing its radiation of heat due to continuous charging, not only ON resistance is enhanced but also continuity loss is increased, and when a large amount of current is kept to flow, there is caused the danger that an element is damaged, for which no consideration has been paid.

The invention has been achieved in view of the technical problems stated above, and its second object is to provide an electronic flash device which can charge at high speed and can charge under the various conditions while conducting step up operations at high conversion efficiency and to provide a camera.

Namely, the invention which solves the aforesaid technical problems us represented by the following.

(1) An example of the invention is represented by an electronic flash charging device, having an electronic flash charging circuit of a separate excitation oscillating type, is composed of a flyback transformer which has at least two windings representing the primary coil and the secondly coil, a switching element to turn on and turn off electric power to be supplied to the primary coil based on control signals to be supplied to a control input terminal, a rectifying diode to rectify flyback pulses generated on the secondly coil when the switching element is changed from ON to OFF, a main capacitor to charge a current rectified by the rectifying diode, and an oscillation controller which generates control signals for changing at least one of the time spans for the switching element to be turned on or off in accordance with a period from generation to extinction of a flyback pulse generated on the secondly coil, and supplies these control signals to a control input terminal of the switching element.

In the present example, the time span for the switching element to be turned on or turned off is made to be changed in accordance with a period from generation to extinction of a flyback pulse generated on the secondly coil. It is therefore possible to charge at high speed through the control of OFF time span of the switching element while conducting step up operations at high conversion efficiency through operations of a separate excitation type. Namely, control of the switching element prevents that charging takes a long time while extending the battery life through operations of a flyback type.

(2) Further, in the aforesaid item (1), the oscillation controller generates the control signal which changes the time span for the switching element to be turned off in accordance with a period from generation to extinction of the flyback pulse generated on the secondly coil.

(3) Further, in the aforesaid item (1), the oscillation controller generates the control signal which controls so that the time span for the switching element to be turned off may be made substantially the same as a period from generation to extinction of the flyback pulse generated on the secondly coil.

In this case, the time span for the switching element to be turned off is made to be mostly the same as a period from generation to extinction of a flyback pulse generated on the secondly coil. It is therefore possible to charge at high speed through the control of OFF time span of the switching element while conducting step up operations at high conversion efficiency through operations of a separate excitation type. Namely, control of the switching element prevents that charging takes a long time while extending the battery life through operations of a flyback type.

(4) Further, in the aforesaid item (1), it is characterized that a charging voltage detector to detect charging voltage of the main capacitor is provided, and the aforesaid oscillation controller generates the control signal mentioned above, referring to the charging voltage of the main capacitor detected by the charging voltage detector stated above.

In this case, control signals stated above are generated by referring to the charging voltage of the main capacitor. It is therefore possible to charge at high speed through the control of OFF time span of the switching element while conducting step up operations at high conversion efficiency through operations of a separate excitation type, and it is possible to detect easily by referring to the charging voltage of the main capacitor in place of detecting extinction of the flyback pulse generated on the secondly coil.

(5) Further, in the aforesaid item (1), it is characterized that a timer means which starts measurement from the start of charging of the main capacitor is provided, and the oscillation controller stated above generates the aforesaid control signal in accordance with results of measurement performed by the timer means.

In this case, control signals stated above are generated by referring to the time from the start of charging of the main capacitor. It is therefore possible to charge at high speed through the control of OFF time span of the switching element while conducting step up operations at high conversion efficiency through operations of a separate excitation type, and it is possible to detect easily by referring to the time from the start of charging of the main capacitor in place of detecting extinction of the flyback pulse generated on the secondly coil.

(6) Further, in the aforesaid item (5), it is characterized that a battery voltage detector which detects voltage of a power supply battery is provided, and the oscillation controller stated above changes relationship between results of measurement by the aforesaid timer means and the aforesaid control signal in accordance with the battery voltage detected by the battery voltage detector.

In this case, control signals stated above are generated by referring to the voltage of the power supply battery. It is therefore possible to charge at high speed through the control of OFF time span of the switching element while conducting step up operations at high conversion efficiency through operations of a separate excitation type, and it is possible to detect easily by referring to the voltage of the power supply battery in place of detecting extinction of the flyback pulse generated on the secondly coil.

(7) Further, in the aforesaid item (1), it is characterized that the switching element is capable of being driven by a voltage lower than that by which the oscillation controller is driven, and it is a voltage control element whose ON resistance is lower than the sum total of internal resistance of the power supply battery and line resistance in the case of power supply from the power supply battery.

In this case, it is possible to apply signals from CPU directly on the control input terminal because a voltage control element is used. It is further possible to apply high voltage on the primary coil by using an element whose ON resistance is low, and thereby to shorten the charging time.

(8) Further, in the aforesaid item (1), it is characterized that a power supply capacitor connected with a power supply battery in series is provided, and this power supply capacitor is of an impedance which is lower than the sum total of internal resistance of the power supply battery and line resistance in the case of power supply from the power supply battery.

In this case, it is possible to apply high voltage on the primary coil because the power supply capacitor with a lower impedance is used, and thereby to shorten the charging time.

(9) Further, in the aforesaid item (1), it is characterized that the rectifying diode is an element whose capacity between terminals is small.

In this case, it is possible to lessen the loss which is caused when the main capacitor is charged, because there is used a rectifying diode whose capacity between terminals is small. In the case of a flyback type, backward withstand pressure can be small. It is therefore possible to make a capacity between terminals of a rectifying diode small.

Here, the small capacity between terminals means that the capacity between terminals is ideally zero or small enough to be able to obtain the effects mentioned above.

(10) Further, in the aforesaid item (1), it is characterized that a flyback detector which detects a flyback pulse generated on the secondary coil stated above is provided, and the oscillation controller mentioned above generates control signals, referring to the results of detection conducted by the flyback detector stated above.

(11) Further, in the aforesaid item (10), it is characterized that the oscillation controller generates the control signals for changing at least one of a span of time for the switching element to be turned on and a span of time for the switching element to be turned off, in accordance with a period from generation to extinction of the flyback pulse generated on the secondary coil detected by the flyback detector.

In this case, control is made, referring to a period during which the flyback pulse detected by the flyback detector is being generated, so that at least one of a span of time for the switching element to be turned on and a span of time for the switching element to be turned off may be changed in accordance with a period from generation to extinction of the flyback pulse generated on the secondary coil. It is therefore possible to prevent generation of the so-called "idle time" which contributes neither to charging on the main capacitor nor to accumulation of energy in a flyback transformer.

Due to this, it is possible to conduct high speed charging which is free from idleness, by controlling the time spans for the switching element to be turned on and turned off while conducting step up operations at high conversion efficiency through operations of a separate excitation flyback type.

(12) Further, in the aforesaid item (10), it is characterized that the oscillation control device generates, referring to the period during which the flyback pulse is being generated, the control signals which control so that the time span for the switching element to be turned off may be substantially the same as a period from generation to extinction of the flyback pulse.

In this case, the time span for the switching element to be turned off is controlled to be changed in accordance with the period from generation to extinction of the flyback pulse generated on the secondary coil, referring to the period during which the flyback pulse detected by the flyback detector is being generated. It is therefore possible to prevent generation of the so-called "idle time" which does not contribute to charging on the main capacitor.

Due to this, it is possible to conduct high speed charging which is free from idleness, by controlling the time span for the switching element to be turned off while conducting step up operations at high conversion efficiency through operations of a separate excitation flyback type.

(13) Further, in the aforesaid item (10), it is characterized that the flyback detector detects generation of a flyback pulse by voltage of the primary coil.

In this case, the period during which the flyback pulse is generated by voltage of the primary coil of a flyback transformer is detected when the time span for the switching element to switch is controlled to be changed in accordance with a period from generation to extinction of the flyback pulse generated on the secondary coil.

Incidentally, since there is outputted to the primary coil the waveform which is the same as the secondary coil output in terms of waveform but is different only in terms of voltage value, if an output of a flyback pulse generated on the primary coil is detected, detection of flyback pulse can be conducted without losing relatively low voltage and charging current. Therefore, it is possible to make the flyback detector to be simple. It is further possible to detect the time span of the flyback pulse more accurately than an occasion where charging voltage and charging time are used for estimation.

Due to this, it is possible to conduct high speed charging which is free from idleness, by controlling the time spans for the switching element to be turned on and turned off.

(14) Further, in the aforesaid item (1), it is characterized that the oscillation controller maintains time spans for on/off signals which the control signals have when the duty ratio of on/off signals to be supplied to the control input terminal arrives at the prescribed value in which the on/off signals are for making the swiching element switched between the ON state and the OFF state.

In this case, when the duty ratio of on/off signals supplied to the control input terminal of the switching element arrives at the prescribed value, the time span for the on/off signals is made to be maintained. Therefore, it is possible to maintain the duty ratio at the appropriate value and thereby to control heat generation.

(15) Further, in the aforesaid item (1), it is characterized that a battery voltage detector which detects voltage of a power supply battery is provided, and the oscillation controller maintains the time span for the on/off signals when the duty ratio of on/off signals, which the control signals have, supplied to the control input terminal arrives at the prescribed value established in accordance with battery voltage detected by the battery voltage detector, in which the on/off signals are for making the switching element switched between the ON state and the OFF state.

In this case, when the duty ratio of the on/off signal supplied to the control input terminal of the switching element arrives at the prescribed value established in accordance with battery voltage detected by a battery voltage detector, the time span for on/off signals is made to be maintained.

Since there is controlled for the battery whose electromotive force has grown weaker so that the time span for the switching element to be turned on may not be increased, load on the battery is lightened. Due to this, charging which lightens load on the battery can be conducted.

(16) Further, in the aforesaid item (1), it is characterized that a battery voltage detector which detects voltage of the power supply battery is provided, and the oscillation controller mentioned above generates the control signals in accordance with the results of detection conducted by the battery voltage detector.

(17) Further, in the aforesaid item (1), it is characterized that a temperature measuring means which measures temperature inside a camera is provided, and when the temperature measuring means detects that a temperature in the camera arrives at the prescribed temperature or higher and the duty ratio of the on/off signal supplied to the control input terminal arrives at the prescribed value or more in which the on/off signals are for making the swiching element switched between the ON state and the OFF state, the oscillation controller stated above maintains the time span for the on/off signal which the control signals have.

In this case, when the temperature inside the camera is detected to be not less than the prescribed temperature and the duty ratio of the on/off signal supplied to the control input terminal of the switching element is not less than the prescribed value, the time span of the on/off signal is made to be switched off to the prescribed value. Namely, it is possible to detect overheat of the switching element and thereby to switch to the lower duty ratio which represses further generation of heat.

(18) Further, in the aforesaid item (1), there is provided a timer which starts measuring from the start of charging of the main capacitor, and the aforesaid oscillation controller generates, in accordance with the results of measurement by the timer, the control signals for changing at least one of the time span for the switching element to be turned on and that for the switching element to be turned off in accordance with a period from generation to extinction of the flyback pulse generated on the secondary coil.

(19) Further, in the aforesaid item (18), it is characterized that the oscillation controller sets the time elapsed in accordance with remaining voltage of the main capacitor to the initial value of the aforesaid timer, referring to the emission time of electronic flash for the preceding emission of electronic flash.

In this case, referring to the emission time for electronic flash of the immediately preceding photographing.

Therefore, charging is controlled appropriately in accordance with remaining voltage of the main capacitor, which results in prevention of generation of idle time.

(20) Further, in the aforesaid item (18), it is characterized that the aforesaid oscillation controller interrupts charging of the main capacitor if any operation is performed in a camera, then, maintains the results of measurement conducted by the aforesaid timer when the interruption was made, and resumes, after completion of the aforesaid operations, the charging for the period following the time when the results of measurement was maintained.

In this case, an arrangement is made so that charging of the main capacitor may be interrupted when any operation is performed in a camera, and the charging for the period following the time of the results of measurement at the interruption time may be resumed, after the operations are completed.

Therefore, charging is controlled appropriately in accordance with remaining voltage of the main capacitor, which results in prevention of generation of idle time. Further, since charging for electronic flash can be interrupted if any operation is performed, even a battery with weak electromotive force can also be used.

(21) Further, in the aforesaid item (18), it is characterized that the oscillation controller supplies to the control input terminal the control signals having prescribed time spans for on/off for reducing a current, when the result of measurement by the aforesaid timer arrives at the prescribed time.

In this case, the time spans for the switching element to be turned on and off are controlled to be changed, making reference to the time elapsed from the start of charging. It is therefore possible to prevent generation of the so-called "idle time" which contributes neither to charging of the main capacitor nor to energy accumulation in the flyback transformer.

When the charging time is extended for the reason such as weakened electromotive force of a battery, load on the battery is lightened because a control is made to reduce a current. Due to this, it is possible to conduct charging wherein load on a battery is lightened, while eliminating waste.

When an oscillation transistor generates heat and thereby the charging time is extended by an increase of continuity loss caused by enhancement of ON resistance, overheat of the oscillation transistor can be prevented because a control is made to reduce a current. Due to this, damage of the element caused by overheat of the oscillation transistor can be prevented.

As stated above, it is possible to conduct appropriate control even when no detection means for grasping the state of electronic flash charging is used, or it is possible to conduct appropriate control by judging the state of charging for electronic flash whose detection is difficult even when the detection means is used.

(22) Further, in the aforesaid item (18), it is characterized that the oscillation controller generates on the control input terminal the control signals having the prescribed time spans for on/off for reducing a current, when the result of measurement by the timer exceeds the first prescribed time, and generates the control signals for cutting off the current when the result of measurement by the timer exceeds the second prescribed time which is longer than the first prescribed time.

In this case, In this case, the time spans for the switching element to be turned on and off are controlled to be changed, making reference to the time elapsed from the start of charging. It is therefore possible to prevent generation of the so-called "idle time" which contributes neither to charging of the main capacitor nor to energy accumulation in the flyback transformer.

When the charging time is extended for the reason such as weakened electromotive force of a battery, load on the battery is lightened because a control is made to reduce a current in the first step and to cut off the current in the second step. Due to this, it is possible to conduct charging wherein load on a battery is lightened, while eliminating waste, and to control so that other functions of a camera may be maintained by cutting off the current.

Even when the charging time is extended abnormally by overheat of the oscillation transistor, it is possible to prevent damage of the element and thereby to secure safety by cutting off the current.

(23) Another example of the invention is an electronic flash device of a separate excitation oscillating type having therein a flyback transformer composed of two windings of at least the primary coil and the secondary coil, a switching element for turning on and off the power supply to be supplied to the aforesaid primary coil based on control signals supplied to a control input terminal, a rectifying diode which rectifies flyback pulses generated in the secondly coil when the switching element changes from ON to OFF, a main capacitor which charges the current rectified by the rectifying diode, an oscillation controller which generates control signals for turning on or off the switching element and supplies these control signals to the control input terminal of the switching element, a charging voltage detector which detects charging voltage of the main capacitor, and a storing means which stores in each accessible address the data of the control signals determined in accordance with the charging voltage, based on the results of detection by the charging voltage detector, wherein the oscillation controller reads data out of the address selected in accordance with the result of detection by the charging voltage detector in the course of charging, and outputs them as control signals.

In the present example, data are read out of the selected address in accordance with the result of detection of charging voltage, in the course of charging, and are outputted as control signals.

As a result, generation of idle time can be prevented, because appropriate control obtained in advance in accordance with charging voltage can be conducted.

(24) Further, in the aforesaid item (23), it is characterized that a battery voltage detector which detects voltage of power supply is provided, and the oscillation controller changes the address selected in accordance with the result of detection by the charging voltage detector in the course of charging, in accordance with battery voltage detected by the battery voltage detector, then reads data out of the changed address, and outputs them as control signals.

In this case, the address selected, in the course of charging, in accordance with the result of detection of charging voltage is changed in accordance with battery voltage, then, data are read from the changed address, and are outputted as control signals.

As a result, it is possible to conduct appropriate control even for the battery whose electromotive force is weakened, by referring to battery voltage of the battery used for charging.

(25) Another example of the invention is an electronic flash device of a separate excitation oscillating type having therein a flyback transformer composed of two windings of at least the primary coil and the secondary coil, a switching element for turning on and off the power supply to be supplied to the aforesaid primary coil based on control signals supplied to a control input terminal, a rectifying diode which rectifies flyback pulses generated in the secondly coil when the switching element changes from ON to OFF, a main capacitor which charges the current rectified by the rectifying diode, a timer means which starts measuring from the start of charging of the main capacitor, s storing means which stores in each accessible address the data of control signals determined in accordance with the result of measurement by the timer means which starts measuring from the start of charging, based on the result of measurement by the timer means, and an oscillation controller which supplies control signals for the switching element to be turned on or turned off to the control input terminal of the switching element, wherein the oscillation controller reads data out of the address selected in accordance with the result of measurement by the timer in the course of charging, and outputs them as control signals.

In the present example, there is controlled so that the time elapsed from the start of charging is referred to, and data of on/off time stored in the table corresponding to the time elapsed are read out, and the switching element changes the time spans for on/off.

It is therefore possible to prevent generation of the so-called "idle time" which contributes neither to charging of the main capacitor nor to energy accumulation in the flyback transformer. Due to this, it is possible to conduct high speed charging wherein waste is eliminated by the control of the time spans for the switching element to be turned on and turned off while conducting step up operations at high conversion efficiency through operations of a separate excitation flyback type.

(26) Further, in the aforesaid item (25), it is characterized that a battery voltage detector which detects voltage of a power supply battery is provided, and the oscillation controller changes, in accordance with battery voltage detected by the battery voltage detector, the address selected in accordance with the result of measurement by the timer means in the course of charging, then reads data from the changed address, and outputs them as control signals.

In this case, when reading data of on/off time stored in the table corresponding to the charging time elapsed, reading is conducted in accordance with battery voltage and an address is shifted.

It is therefore possible to prevent generation of the so-called "idle time" which contributes neither to charging of the main capacitor nor to energy accumulation in the flyback transformer, in accordance not only with charging time but also with variation of battery voltage.

As a result, it is possible to conduct appropriate control even for the battery whose electromotive force is weakened, by referring to battery voltage of the battery used for charging.

As explained in the aforesaid items (1)–(26), a camera of the invention can be realized to be equipped with an electronic flash device wherein rapid charging and charging under prescribed state in accordance with various conditions. can be conducted while step up operations at high conversion efficiency are maintained.

Each of FIGS. 3(a)–3(f) is a time chart showing a signal waveform in an electronic flash device in an embodiment of the invention.

Figure 4:
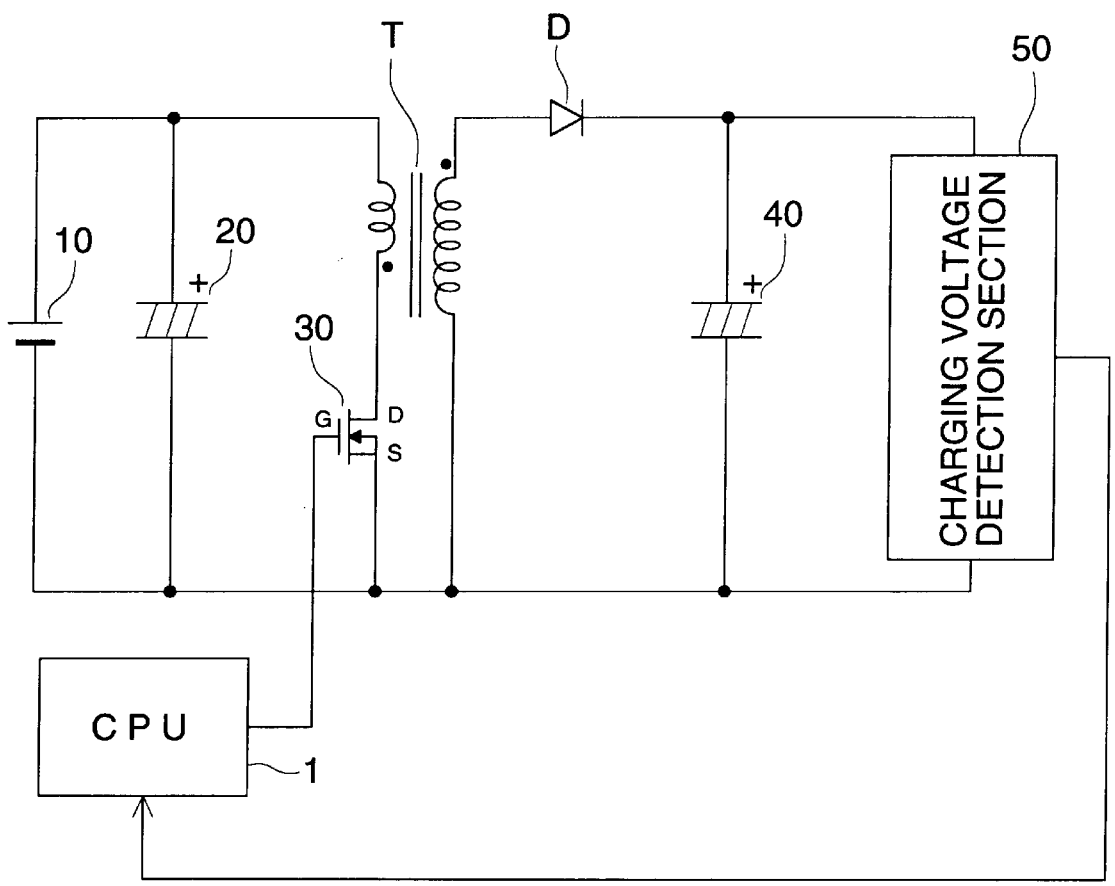

FIG. 4 is a block diagram showing another structure of an electronic flash device used in an embodiment of the invention.

Figure 5:
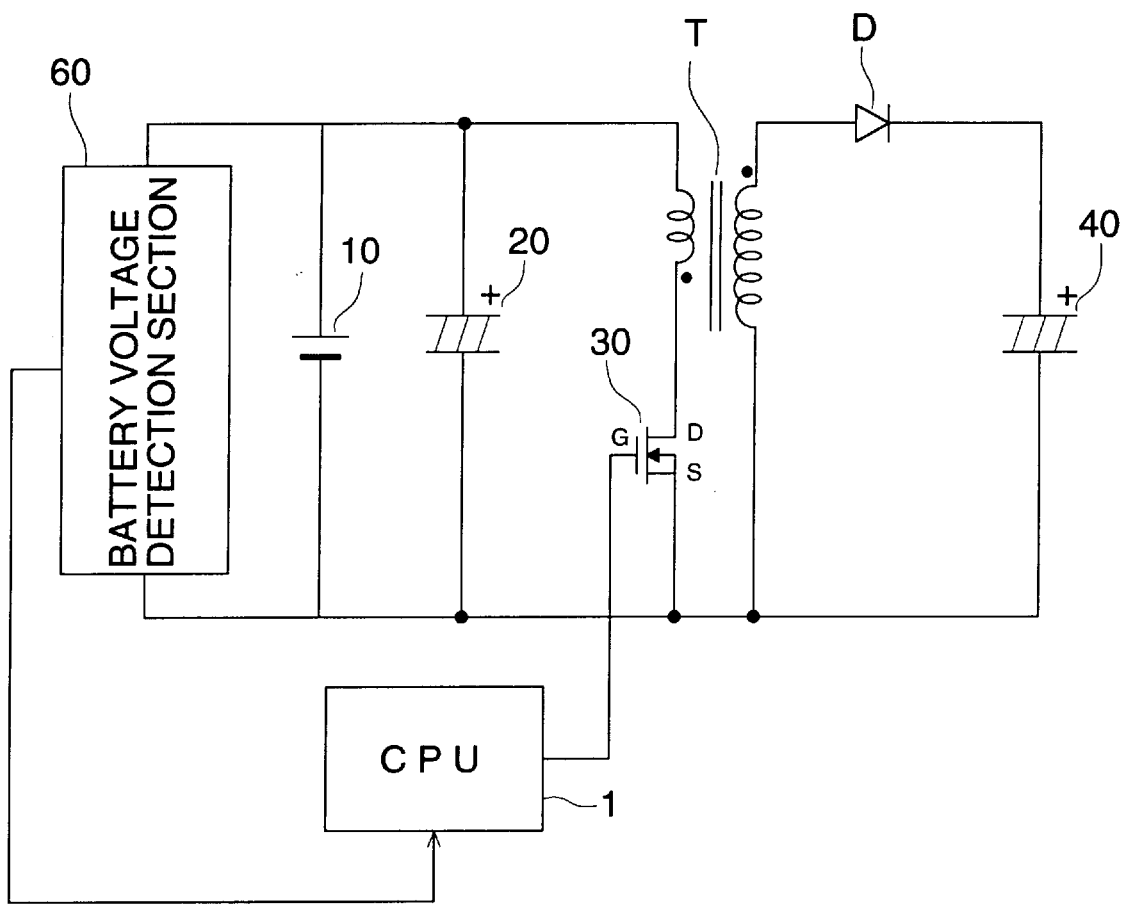

FIG. 5 is a block diagram showing still another structure of an electronic flash device used in an embodiment of the invention.

Figure 6:
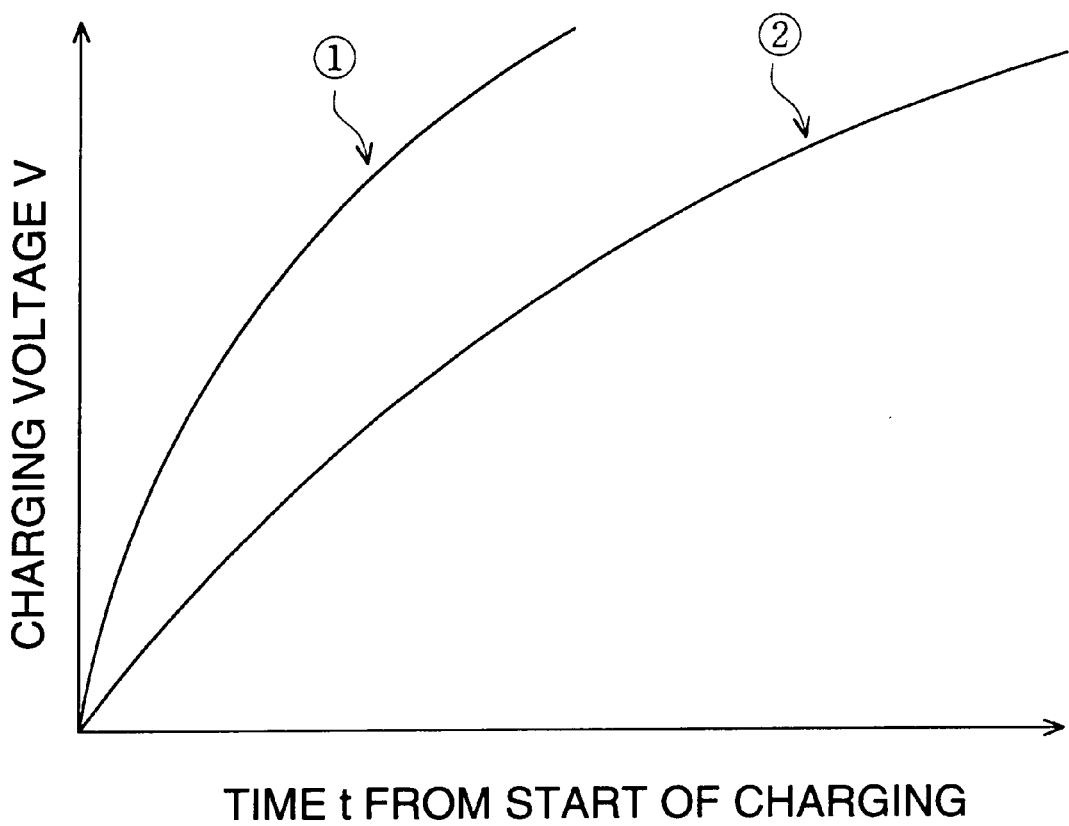

FIG. 6 is a diagram of characteristics showing the relation between the state of a battery and the charging characteristics in an electronic flash device in an embodiment of the invention.

Figure 7:
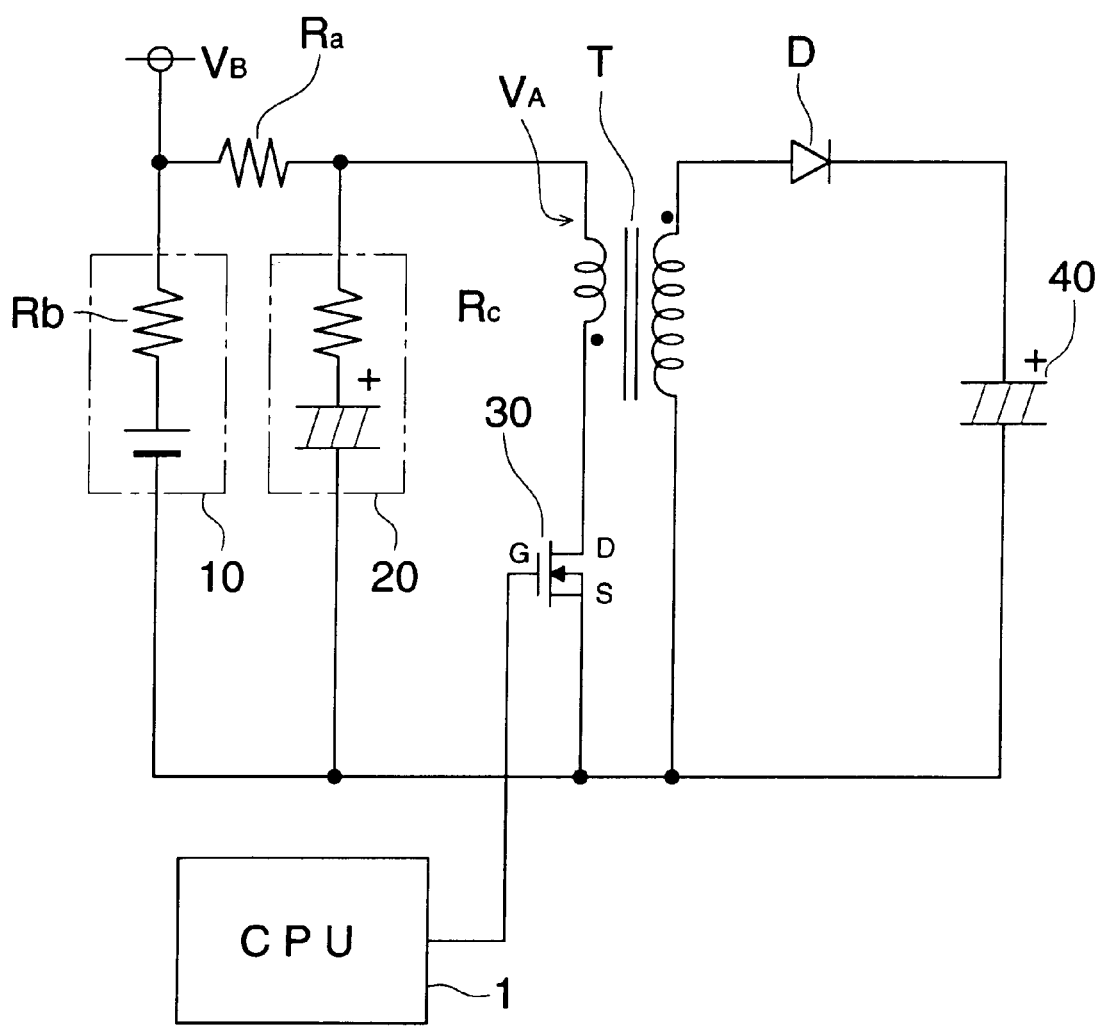

FIG. 7 is a block diagram showing another structure of an electronic flash device used in an embodiment of the invention.

Figure 8:
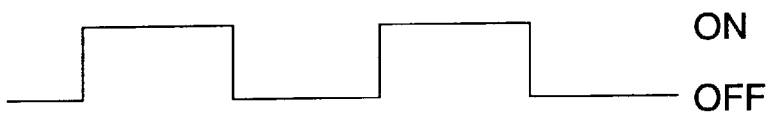
Figure 8:
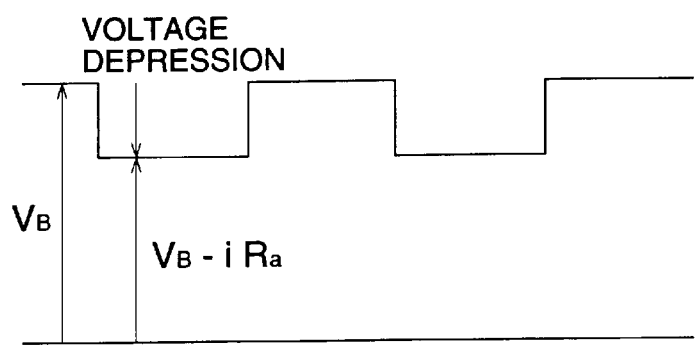
Figure 8:
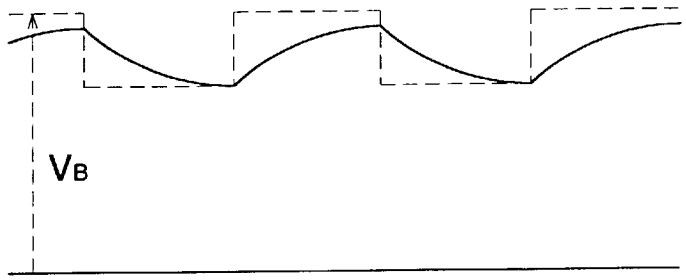

Each of FIGS. 8(a)–8(c) is a time chart showing a signal waveform in an electronic flash device in an embodiment of the invention.

Figure 9A:
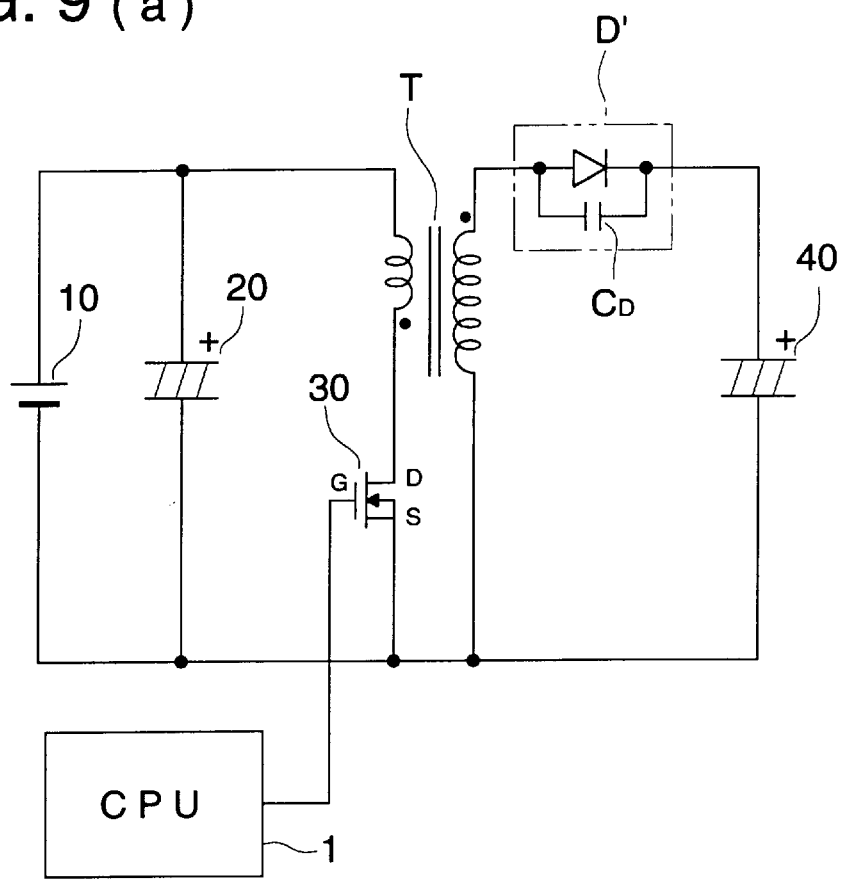
Figure 9B:
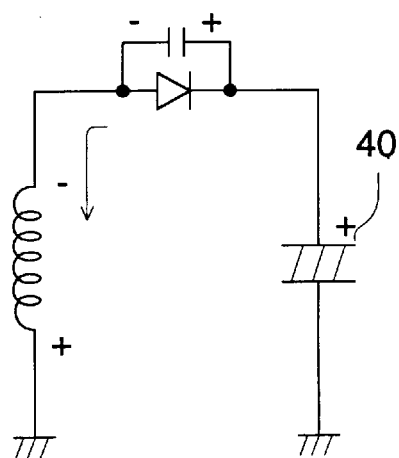
Figure 9C:
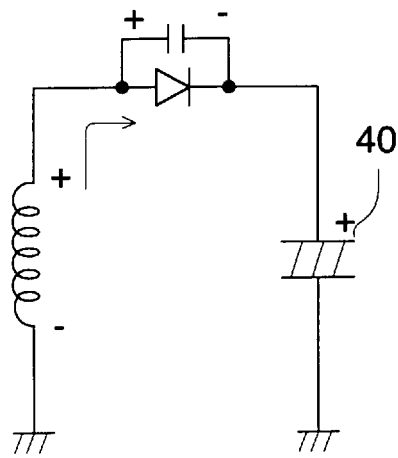

Each of FIGS. 9(a)–9(c) is an illustration showing the state of operations of an electronic flash device used in an embodiment of the invention.

Figure 10:
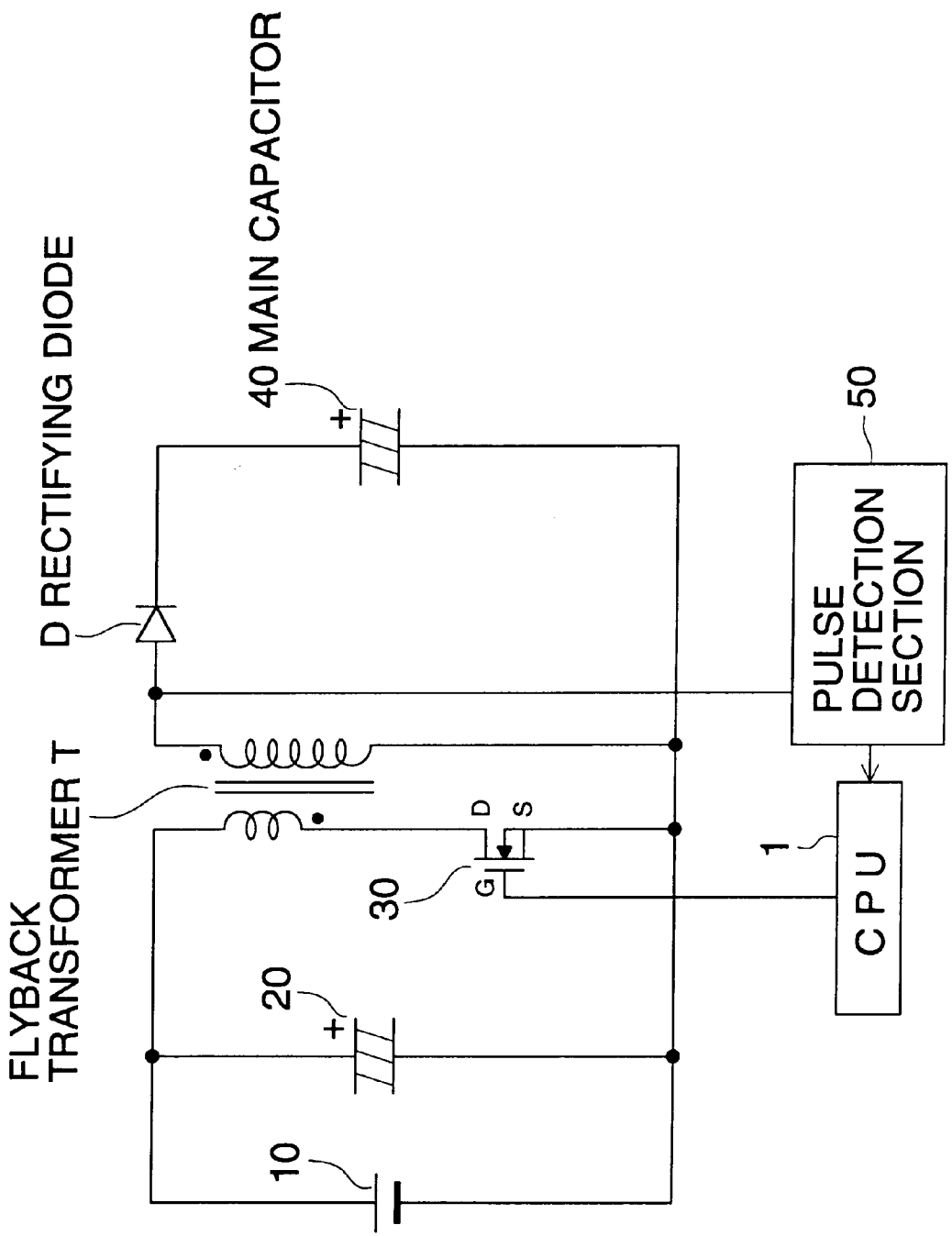

FIG. 10 is a block diagram showing the structure of an electronic flash device used in an embodiment of the invention.

Figure 11:
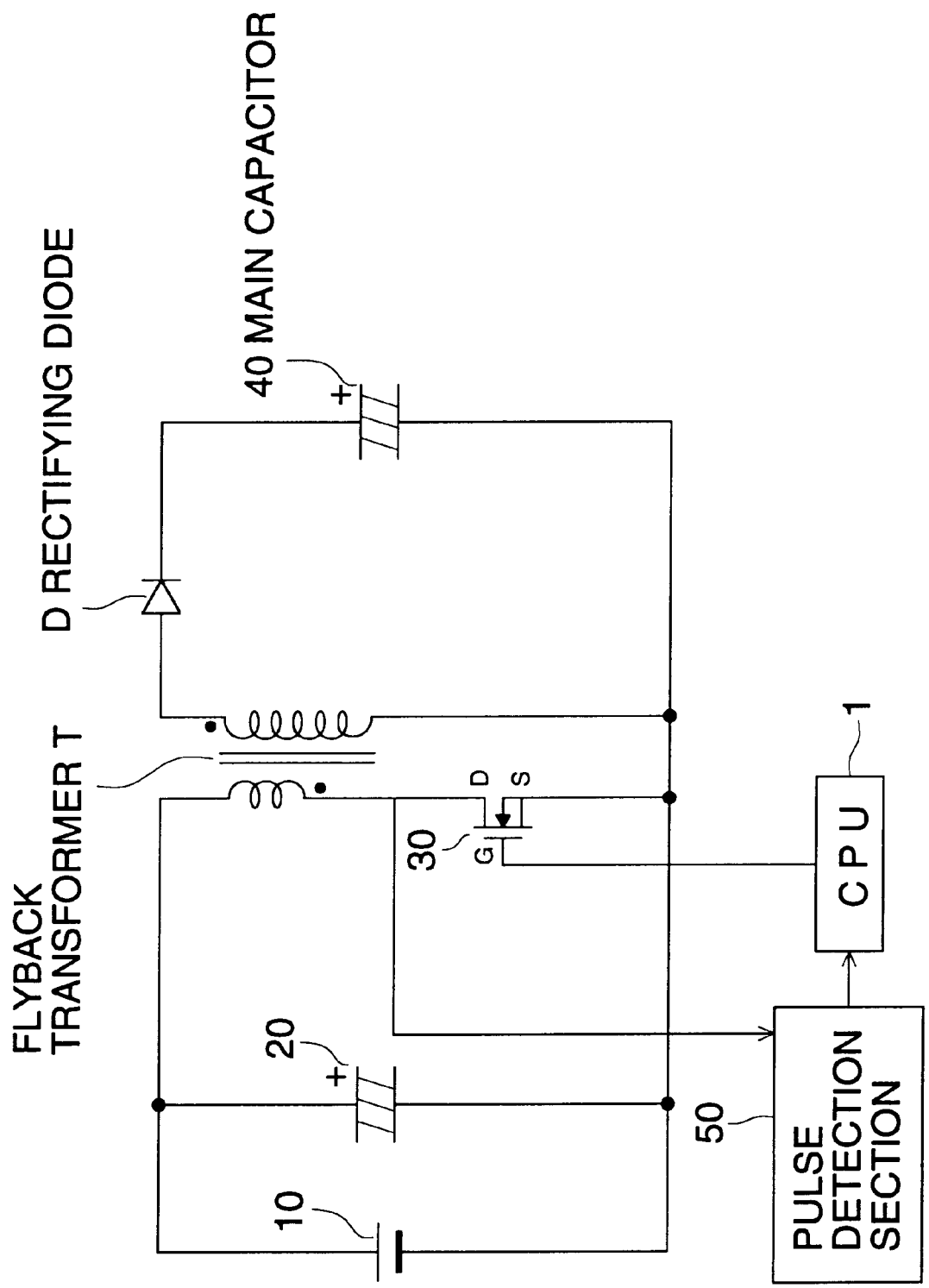

FIG. 11 is a block diagram showing the structure of an electronic flash device used in an embodiment of the invention.

Figure 12:
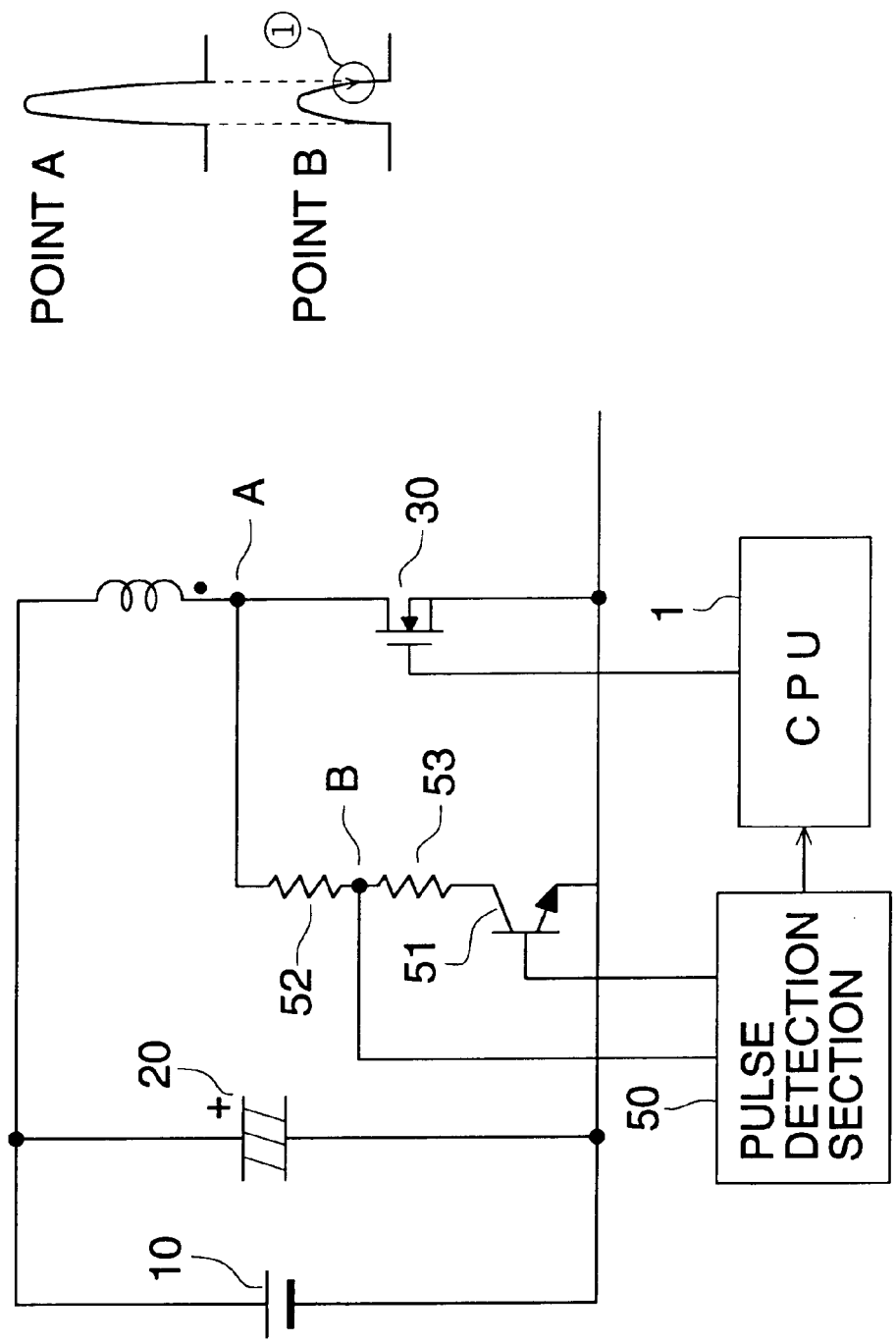

FIG. 12 is a block diagram showing the structure of an electronic flash device used in an embodiment of the invention.

Figures 13, 14:
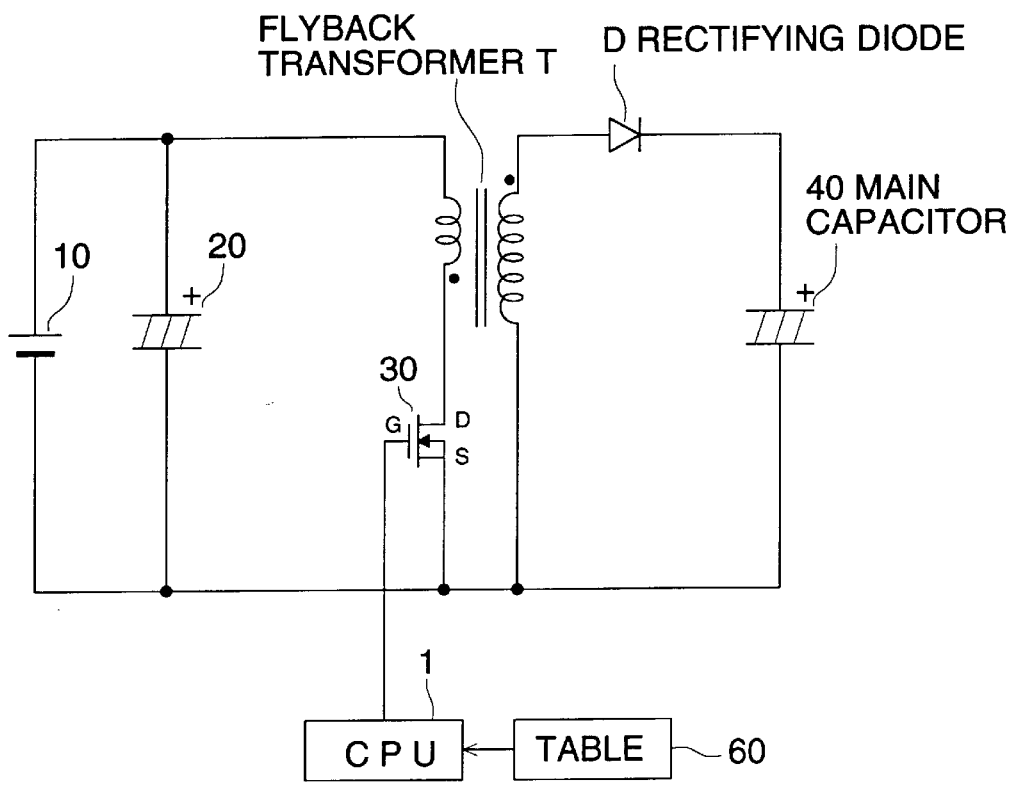

FIG. 13 is a block diagram showing the structure of an electronic flash device used in an embodiment of the invention.

FIG. 14 is an illustration showing the contents of the table used for an electronic flash device used in an embodiment of the invention.

Figure 15:
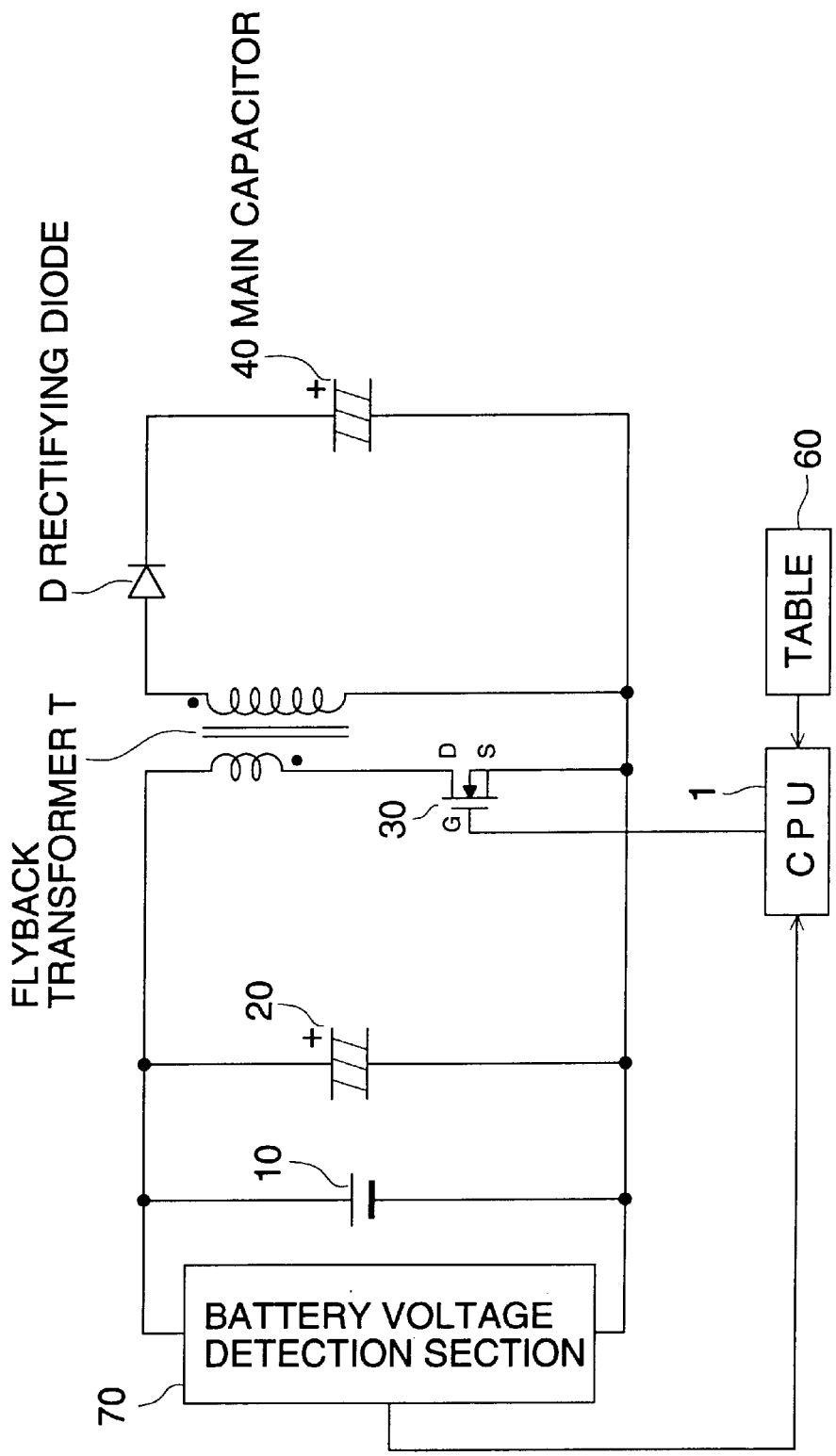

FIG. 15 is a block diagram showing the structure of an electronic flash device used in an embodiment of the invention.

Each of FIGS. 16(a)–16(c) is an illustration showing the contents of the table used for an electronic flash device used in an embodiment of the invention.

Figures 17, 18:
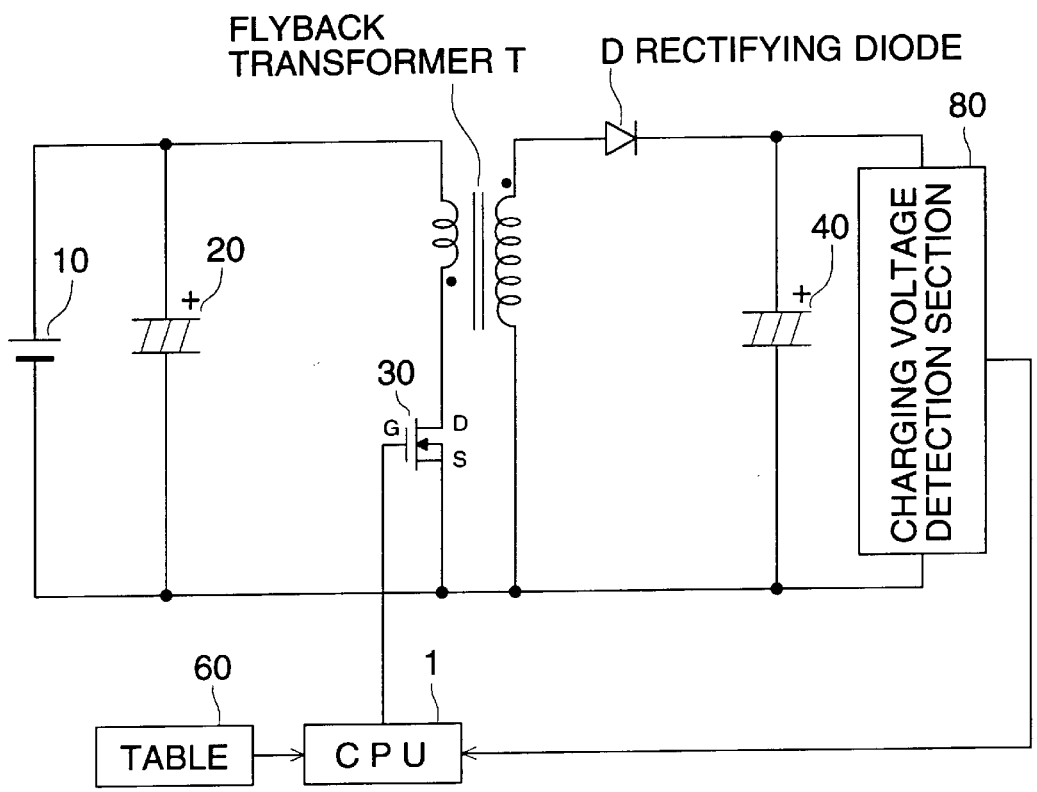

FIG. 17 is a block diagram showing the structure of an electronic flash device used in an embodiment of the invention.

FIG. 18 is an illustration showing the contents of the table used for an electronic flash device used in an embodiment of the invention.

Figure 19:
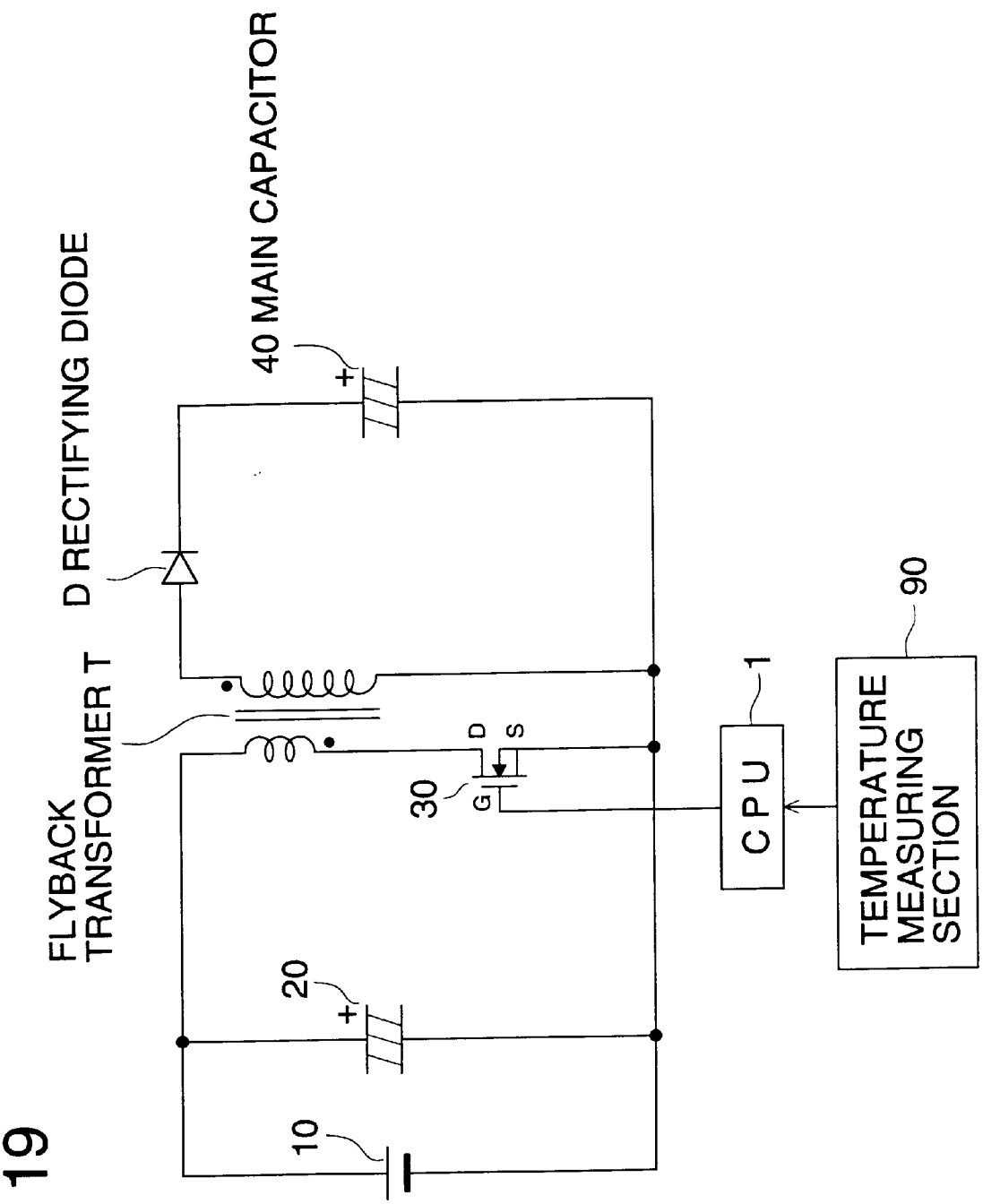

FIG. 19 is a block diagram showing the structure of an electronic flash device used in an embodiment of the invention.

Figure 20:
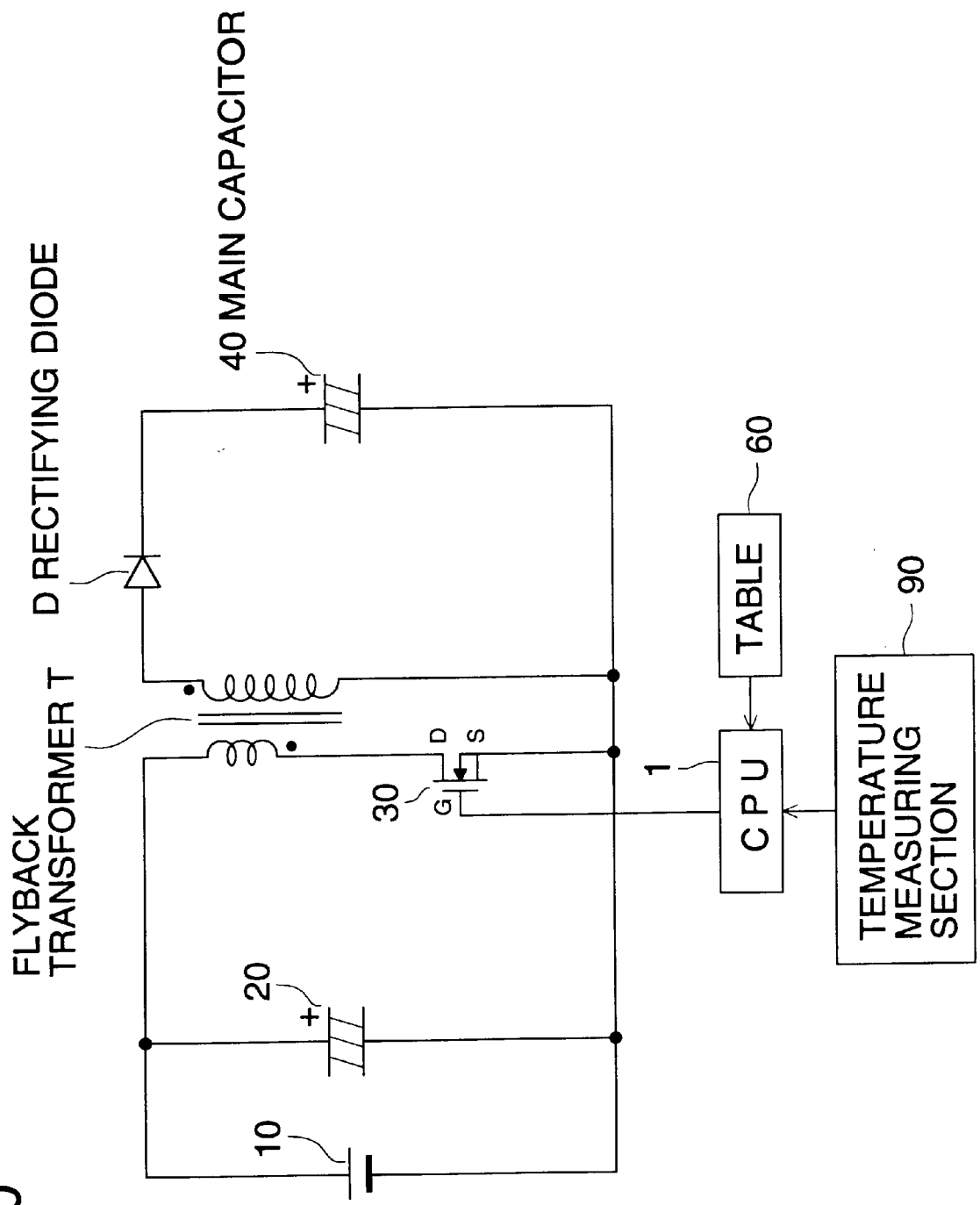

FIG. 20 is a block diagram showing the structure of an electronic flash device used in an embodiment of the invention.

Figure 21:
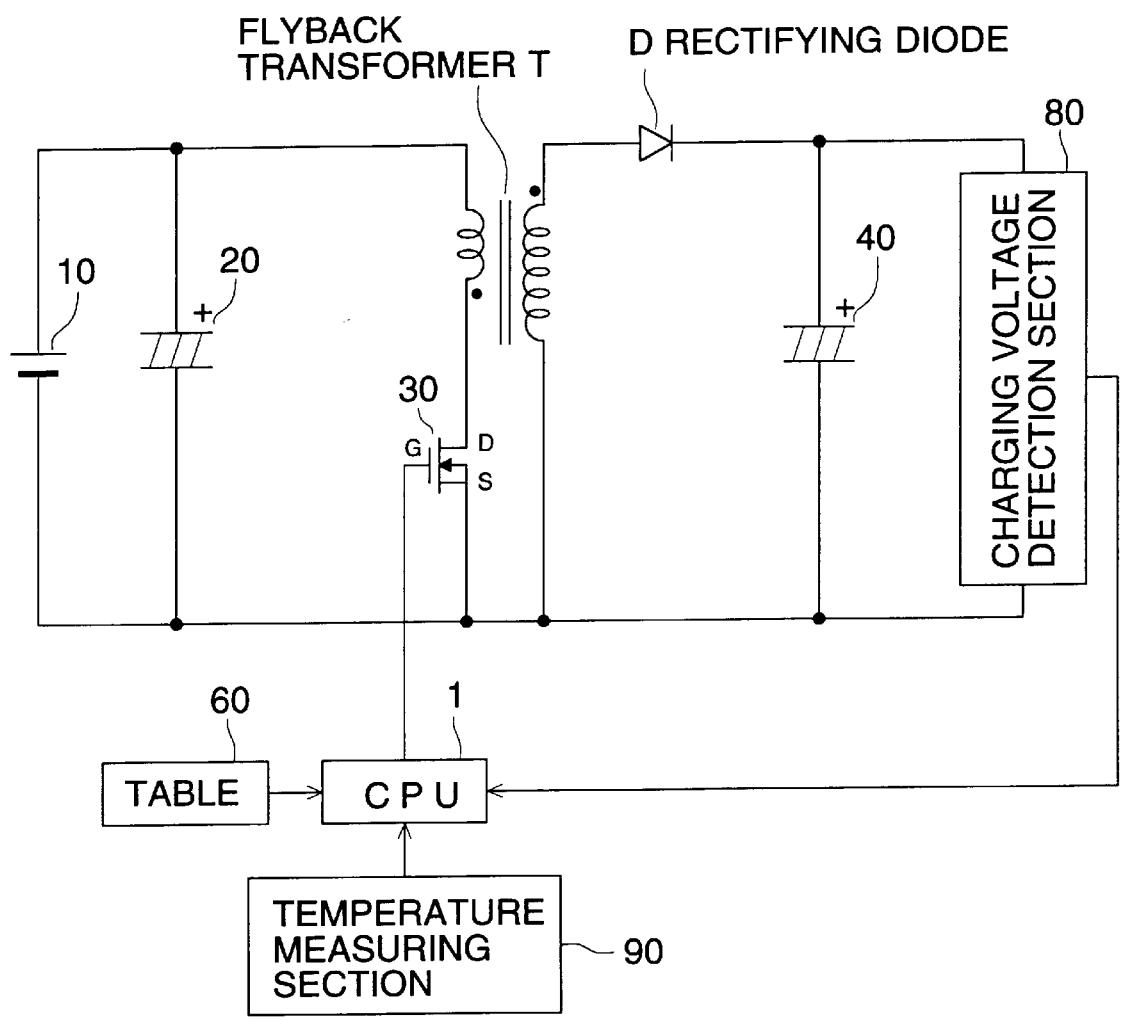

FIG. 21 is a block diagram showing the structure of an electronic flash device used in an embodiment of the invention.

Each of FIGS. 22(a) and 22(b) is an illustration showing the contents of the table used for an electronic flash device used in an embodiment of the invention.

Each of FIGS. 23(a) and 23(b) is an illustration showing the contents of the table used for an electronic flash device used in an embodiment of the invention.

Each of FIGS. 24(a) and 24(b) is an illustration of electronic flash emission used in an embodiment of the invention.

Figures 24, 25:
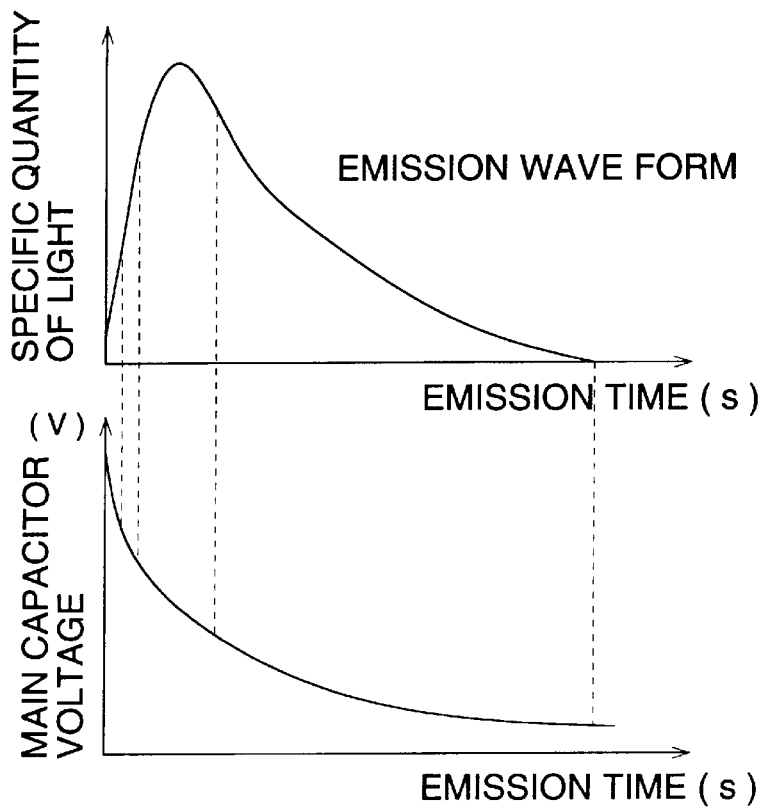

FIG. 25 is an illustration showing the contents of the table used for an electronic flash device used in an embodiment of the invention.

FIG. 26 is an illustration showing the contents of the table used for an electronic flash device used in an embodiment of the invention.

FIG. 27 is an illustration showing the contents of the table used for an electronic flash device used in an embodiment of the invention.

DETAILED DESCRIPTION OF THE INVENTION (First embodiment)

An embodiment of the invention will be explained in detail as follows.

(Structure of an electronic flash device)

Figure 1:
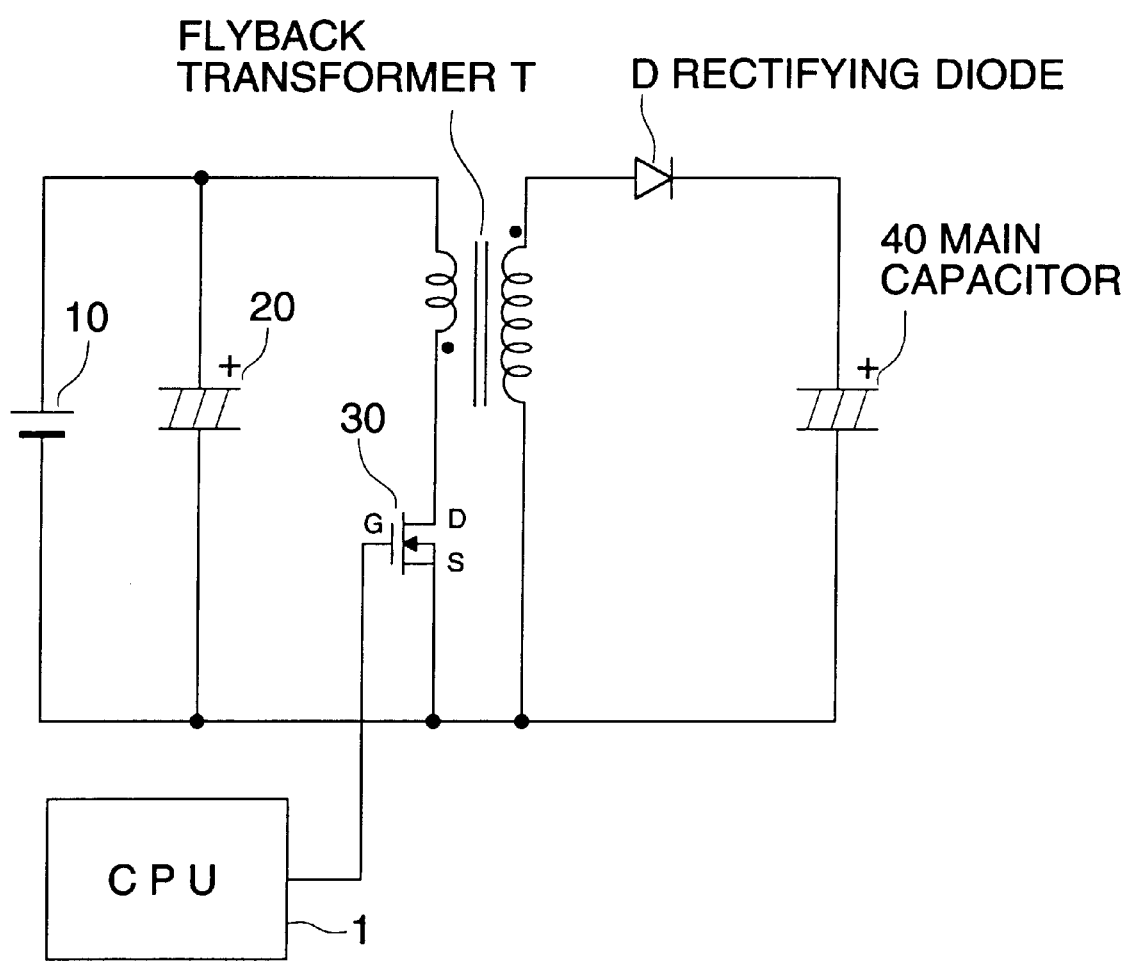
FIG. 1 is a block diagram showing the structure of an electronic flash device used in an embodiment of the invention.

First, the schematic structure of an electronic flash device used in the present embodiment will be explained as follows, referring to FIG. 1. FIG. 1 represents a functional block diagram showing the general electrical structure of an electronic flash device in an embodiment of the invention.

The electronic flash device in the present embodiment shown in FIG. 1 is an electronic flash device of a separate excitation flyback type wherein a circuit of a separate excitation oscillation type and a circuit of a flyback type are combined to be used.

A step up circuit of a separate excitation flyback type is provided with a characteristic that consumption current can be controlled, because behavior of the current flowing through the primary coil is constant independently of charging voltage, due to operations of a flyback type wherein an electric current is caused to flow through the primary coil to accumulate energy in the transformer, and flyback pulses generated in the secondary coil when the current flowing through the primary coil is cut off are accumulated in the main capacitor.

The step up circuit is further provided with characteristics of separate excitation oscillation which can prevent release of waste energy by controlling on/off of the switching element so that no heat generation may be caused by current saturation of the switching element and magnetic saturation as well as overcurrent of the transformer, because on/off of the switching element connected to the primary coil can be controlled from the outside.

Since these characteristics are provided, only supply of relatively simple oscillation control signals of constant duty ratio and frequency makes it possible to conduct charging for electronic flash at high conversion efficiency stably from the start to end of the charging, namely to extend a life of the battery, which is an advantage.

In this case, the numeral 1 represents CPU which controls various parts of an electronic flash device and a camera (not shown), and it is a control means which generates control signals for controlling on/off of a switching element stated later and supplies these control signals to the control input terminal of the switching element.

The numeral 10 represents a power supply battery for supplying power supply voltage, and it supplies power supply to various parts of a camera (not shown) and to an electronic flash device in the present embodiment.

The numeral 20 represents a power supply capacitor which is connected to power supply battery 10 in parallel. It is preferable that this power supply capacitor 20 has impedance which is lower than the sum total of internal resistance of the power supply battery 10 and line resistance in the case of the supply of the power source from the power supply battery 10.

The numeral 30 represents a switching element through which the current to be supplied to a primary coil stated later is turned on and turned off based on control signals supplied from CPU 1 to control input terminal G. It is preferable that this switching element 30 can be driven by low voltage, and it is a voltage control element (FET) having ON resistance which is lower than the sum total of internal resistance of the power supply battery 10 and line resistance in the case of the supply of the power source from the power supply battery 10. Incidentally, however, it is also possible to use a bipolar transistor in place of the voltage control element (electric field effect transistor (FET)) for this switching element 30.

Low ON resistance preferably means 0.3 Ω or less, and 0.1 Ω or less is more preferable. It is ideal that ON resistance is substantially zero Ω. In particular, when the switching element 30 is an element which can be driven by voltage that is not higher than the driving voltage for CPU 1, excessive power supply will not be needed. It is further preferable that the switching element 30 is of a type which can be driven with control input terminal G connected directly to an output terminal of CPU 1. In other words, when the switching element is represented by the element capable of being driven by driving voltage for CPU 1, excessive power supply is not needed, and a buffer circuit for voltage adjustment does not need to be provided between CPU 1 and control input terminal G. Owing to this, control signals from CPU 1 can be directly inputted in control input terminal G of the switching element 30.

T represents a flyback transformer which steps up flyback pulses generated from a primary winding and outputs them to a secondary winding, and the primary winding is connected to the switching element 30 in series.

D represents a rectifying diode which rectifies flyback pulses generated on the secondary winding of the flyback transformer T, and an element whose capacity between terminals is small is preferable.

The numeral 40 is a main capacitor in which the current rectified by the rectifying diode D is accumulated for electronic flash emission. Incidentally, a circuit for electronic flash emission which is not shown is to be connected to the main capacitor 40.

(Operations of electronic flash device)

Figure 2:
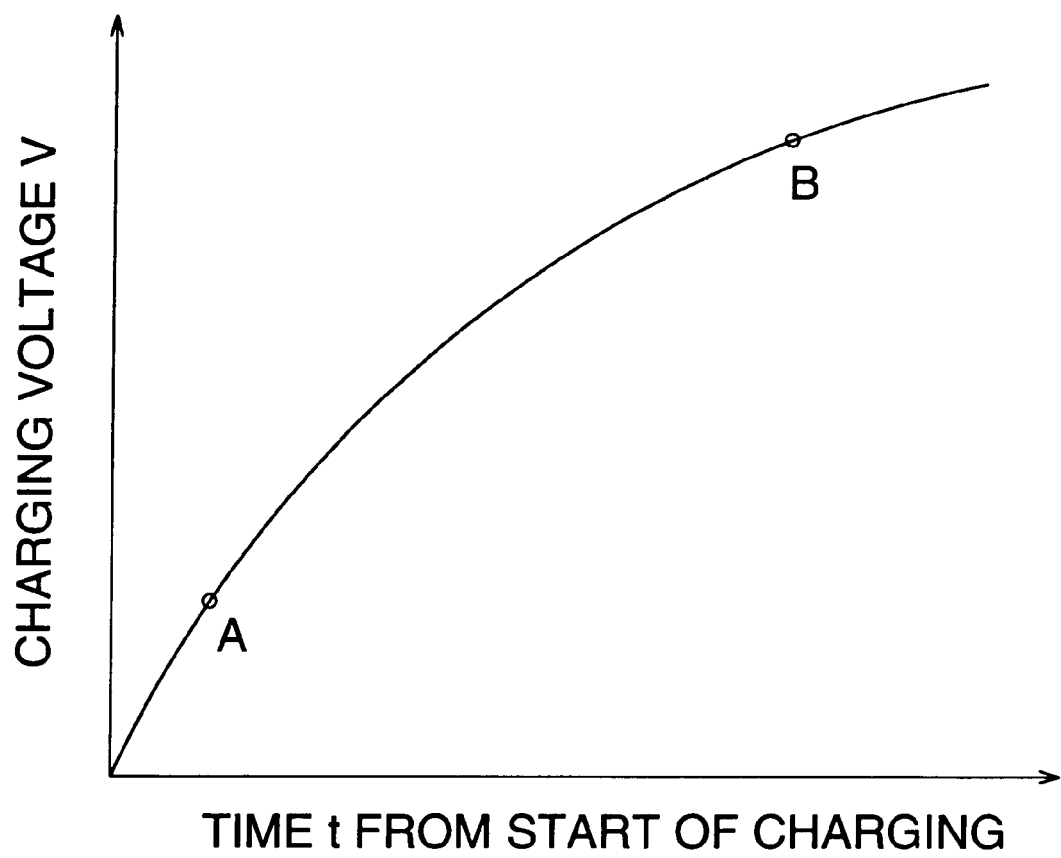
FIG. 2 is a diagram of characteristics showing an example of charging characteristics of an electronic flash device in an embodiment of the invention.

Operations of the electronic flash device in the present embodiment will be explained as follows, referring to FIGS. 3(*a*)–3(*f*). Incidentally, FIG. 2 is a diagram of characteristics showing an example of the relation between time t from the start of charging in the electronic flash device in the present embodiment and charging voltage V of the main capacitor 40, and each of FIGS. 3(*a*)–3(*f*) is a time chart showing a waveform of each section in the state of operations of the electronic flash device.

Figure 3:
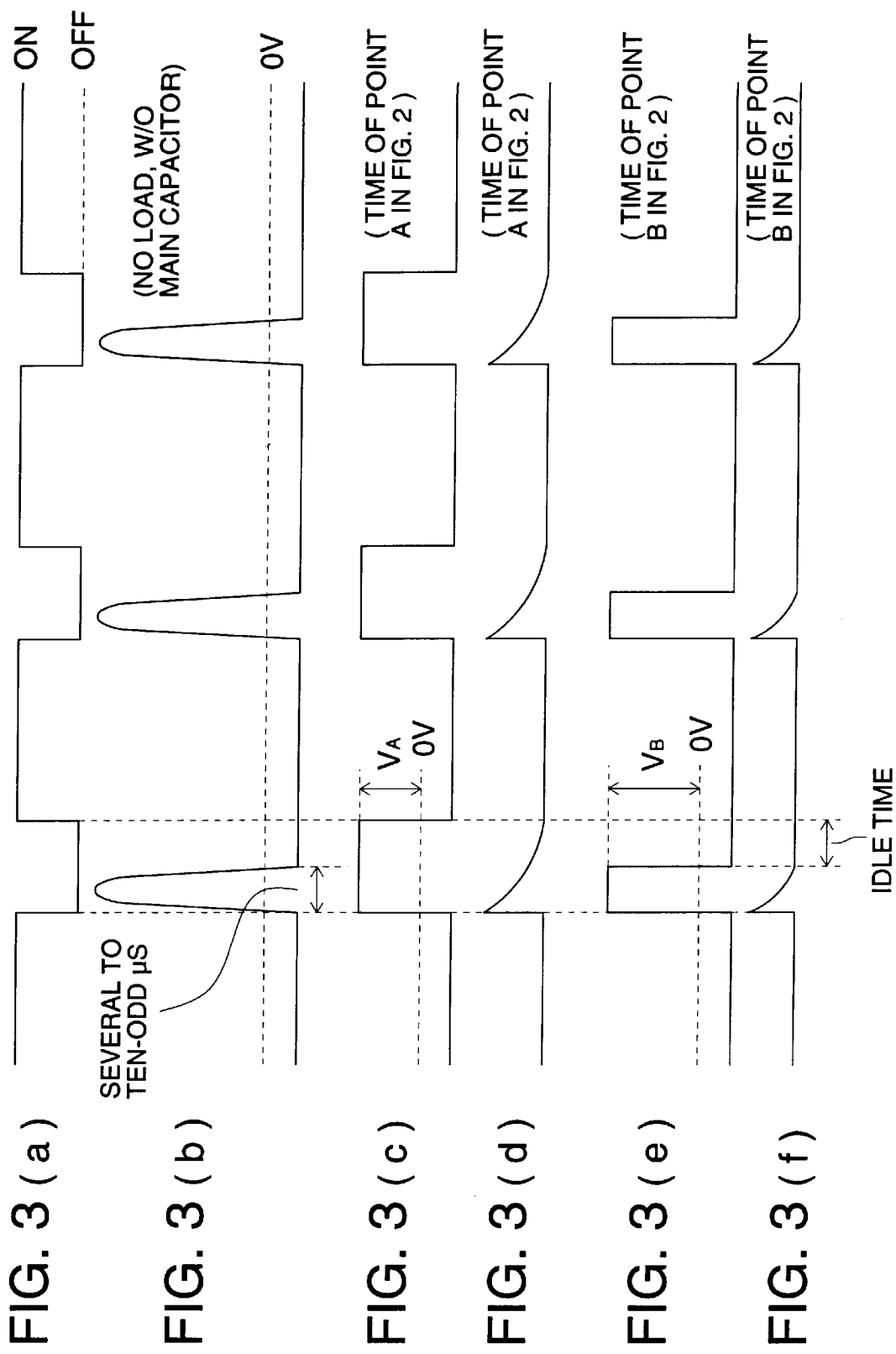

From the moment of start charging, CPU 1 generates control signal (FIG. 3(*a*)) which is on the same level as of the operation voltage of CPU, for controlling on/off of the switching element 30. This control signal is supplied to a control input terminal (gate (G)) of the switching element 30, and continuity (ON) between drain (D) and source (S) and cutting off (OFF) between drain (D) and source (S) are switched by this control signal.

In this case, when the switching element 30 is on the condition of continuity, there flows an electric current corresponding to ON resistance of the switching element 30 and to an amount equivalent to DC resistance of the primary winding of the flyback transformer T.

Then, when the control signal is turned off, the switching element 30 immediately enters the state of interruption. In this case, there is generated backward electromotive force corresponding to inductance of the primary winding and the value of the flowing current.

Incidentally, in the case of no load (when the main capacitor is not connected), flyback pulses are turned into pulses of several hundred volts–1000 volts within a generation time of several micro seconds–ten-odd micro seconds in the electronic flash device generally, and are outputted from the secondary winding.

Incidentally, the state of flyback pulses under the condition of no load and no main capacitor is shown in FIG. 3(*b*). Namely, polarity of the transformer is established so that when the switching element 30 is in the state of continuity, negative voltage may appear, while when the switching element 30 is in the state of interruption, pulses of backward electromotive force may be of the positive voltage.

Further, in the electronic flash device of a flyback type, backward electromotive force generated in the case of interruption of the switching element 30 is to be used for charging. Therefore, electric current consumption of power supply battery 10 at the start of charging and that at the completion of charging are mostly the same.

Further, in the electronic flash device of a flyback type, there is employed a charging system wherein a period during which a current flows from a power supply battery to the primary coil and a period during which a charging current flows from the secondary coil to the main capacitor are made to be different in terms of timing on an interlocking basis. Therefore, the behavior that the switching element 30 is turned on and a current flows through the primary coil is always constant independently of charging voltage. Accordingly, electric current consumption can be controlled in the course of charging for electronic flash, which results in achievement of longer life of a battery.

Then, when flyback pulses appearing on the secondary winding are rectified by rectifying diode D, charging current flows through the main capacitor 40.

Incidentally, FIG. 3(*c*) shows a waveform of voltage for charging the main capacitor 40 at the time of start charging (in the vicinity of point A in FIG. 2) where the main capacitor 40 is at low voltage, while FIG. 3(*d*) shows a waveform of the current for charging the main capacitor 40 at the time of start charging (in the vicinity of point A in FIG. 2) where the main capacitor 40 is at low voltage.

Further, FIG. 3(*e*) shows a waveform of voltage for charging the main capacitor 40 at the time to finish charging (in the vicinity of point B in FIG. 2) where the main capacitor 40 is at relatively high voltage, while FIG. 3(*f*) shows a waveform of the current for charging the main capacitor 40 at the time to finish charging (in the vicinity of point B in FIG. 2) where the main capacitor 40 is at relatively high voltage.

In this case, as is apparent from a comparison between FIG. 3(*d*) and FIG. 3(*f*), when charging is advanced and voltage of the main capacitor 40 is enhanced, a period which does not contribute to charging is increased. Namely, the period after generation of flyback pulses which is immediately after the state of interruption of the switching element 30 represents waste time which contributes neither to charging of the main capacitor nor to energy accumulation in the primary winding.

Therefore, under this state, the time span of ON which contributes to energy accumulation (namely, a period from generation to extinction of flyback pulses) and the time span of OFF for control signals (namely, the time span for OFF of the switching element) are made to be mostly the same each other, with regard to the control signals generated from CPU 1.

In this case, any of the following cases represents that a period from generation to extinction of flyback pulses and the time span of OFF for control signals are made to be mostly the same each other.

(1) The time span for ON remains the same and the time span for OFF is shortened.

(2) The time span for ON is extended and the time span for OFF is shortened.

(3) The time span for ON is extended and the time span for OFF remains the same.

When the aforesaid item (1) is employed, it is possible to attain only by increasing the OFF time during the period from the start of charging to the completion of charging, which is preferable. In particular, when trying to employ the item (3), the ON time also needs to be increased. Since the roles (operations) of the ON time and the OFF time are represented respectively by "to accumulate energy in the transformer within the ON time" and "to release, within the OFF time, as charging current the energy accumulated in the transformer", what the ON time is increased is on the assumption that energy accumulated in the transformer can be increased accordingly. This lowers the degree of freedom for the circuit design. Further, when the ON time is increased excessively, there is a possibility that battery voltage drops rapidly within one time of ON.

In the case of the item (2), for example, when the step of time setting is only 1 $\mu$s on occasion to establish the time ratio of ON and OFF to a certain percentage, it is sometimes judged to be appropriate in terms of circuit design to change the ON time slightly in addition to the change of the OFF time. Thus, the item (2) is also preferable in terms of the degree of freedom in circuit design.

EXAMPLE

When it is assumed that the duty ratio of 58% is taken after the setting of ON:10 $\mu$s and OFF:8 $\mu$s (duty ratio: 55.6%) when changing the time as charging voltage rises, the setting of ON:11 $\mu$s and OFF:8 $\mu$s (duty ratio: 57.9%) with the changed ON time is closer to the desired setting than the setting of ON:10 $\mu$s and OFF:7 $\mu$s (duty ratio: 58.8%). In the following explanation, the OFF time is shortened without changing the ON time as an example.

By eliminating the idle time as stated above, it is possible to increase the number of flyback pulses generated within a specified period, or to make the pulses to be greater. Therefore, it is possible to increase charging current, which makes the rapid charging possible. Even in this case, current from the power supply battery increases slightly because the duty ratio grows greater. However, it is possible to conduct charging while keeping high efficiency, without having the control that the oscillation transistor is turned on when charging current is flowing, because the oscillation transistor is turned on after extinction of the flyback pulses.

With regard to discrimination of point A and point B in FIG. 2, it is realized by providing charging voltage detecting section 50 to be in parallel with the main capacitor as shown in FIG. 4, and thereby by supplying the results of the detection to CPU 1.

Further, as is apparent from FIG. 2, it is also possible that CPU 1 estimates charging voltage V from charging time t and OFF time for the control signal is changed, because there is a prescribed relation between the charging time t and the charging voltage V. In this case, there is an advantage that the circuit structure is simplified because the charging voltage detecting section 50 is not needed. In this case, the table for the charging time t and the charging voltage V can be prepared, and CPU 1 can refer to that table.

Further, as shown in FIG. 5, it is also possible to estimate characteristics of the charging time t and charging voltage V stated above in accordance with battery voltage even by providing battery voltage detecting section 60 which detects voltage of power supply battery 10. In this case, it is possible to simplify the circuit structure by providing battery voltage detecting section 60 which handles low voltage in place of charging voltage detecting section 50 which handles high voltage, which is an advantage. For example, under the condition that a battery is fresh and powerful, charging characteristic shown in 1 in FIG. 6 is indicated, while under the condition that the battery becomes less powerful, charging characteristic shown in 2 in FIG. 6 is indicated. So, the battery voltage detecting section 60 detects the battery voltage, and in accordance with the voltage thus detected, the characteristic curve in FIG. 6 is estimated, then charging voltage V is obtained in accordance with time t covering from the start of charging, and thereby idle time stated earlier can be eliminated.

Incidentally, in the example stated above, when a voltage control element (electric field effect transistor (FET)) is used in place of a bipolar transistor for the switching element 30, it is possible to simplify the circuit structure because control signals from CPU 1 can be supplied directly to a control input terminal, which is an advantage.

Further, by using an element having low ON resistance for the switching element 30, it is possible to increase charging current because high voltage can be applied on the primary coil. As a result, charging time can be shortened, which is preferable.

Further, in the present embodiment, there is provided power supply capacitor 20 which is arranged to be in parallel with power supply battery 10. Incidentally, when taking resistances of the power supply battery 10, the power supply capacitor 20 and a line into consideration, they can be shown as in FIG. 7. Namely, line resistance is represented by Ra, internal resistance of the power supply battery 10 is represented by Rb, and internal resistance (impedance) of the power supply capacitor 20 is represented by Rc.

In this case, let it be assumed that current i flows in response to on/off of control signals. When there is no power supply capacitor 20 in this case, voltage in the primary winding of flyback transformer T falls down to VB–iRa when the switching element 30 is in the state of continuity, provided that VB represents voltage for no load where the switching element 30 is in the state of interruption. Namely, the voltage waveform is turned into a rectangular wave as shown in FIG. 8(b).

However, when the power supply capacitor 20 exists, there is obtained the smoothing effect as shown with solid lines in FIG. 8(c), resulting in small voltage fluctuation. In particular, voltage drop at the timing (timing when the control signal is turned off) of generation of flyback pulses can be repressed. Therefore, it is possible to contribute greatly to charging. In this case, it is preferable that the power supply capacitor 20 is lower in terms of impedance than the sum total of internal resistance Rb of the power supply battery 10 and line resistance Ra in the case of power source supply from the power supply battery, because it is possible to minimize the voltage fall.

Further, rectifying diode D also has capacity component as shown in FIG. 9(a). Therefore, when the switching element 30 enters the state of interruption where flyback pulses are generated and a charging current is about to flow through main capacitor 40 (FIG. 9(c) from the state where the switching element 30 is in the state of continuity and backward voltage is applied on rectifying diode D (FIG. 9(b)), this component is charged from the backward voltage to be of the size of charging voltage of the main capacitor. Namely, the size of this capacity component becomes loss of charging as it is.

It is therefore preferable to use rectifying diode D whose capacity is small. In the case of a flyback type, reverse withstand pressure can be smaller, compared with a forward type, which makes it easy to make capacity between terminals of a rectifying diode smaller.

Incidentally, voltage in the case of a forward type is about 1 kV because of backward voltage of flyback pulses, and that in the case of a flyback type takes a value (approx. 100 V) determined by the turn ratio of the transformer and voltage of a power supply battery. Since the withstand pressure and the capacity of the diode are in the proportional relation, it is easy, in the flyback type, to make loss small by setting capacity of the rectifying diode to be small.

Though there has been explained above using the embodiment where idle time is eliminated through constant ON time and shortened OFF time, the invention is not limited to this operation. For example, it is also possible to eliminate the idle time stated above through extended ON time and constant OFF time. In this case, it is possible to lessen idle time for charging the main capacitor 40 through great accumulated energy by extending ON time in response to advancement of charging.

Incidentally, in this case, it is preferable to start charging at oscillation frequency higher than the conventional one in advance, because the oscillation frequency is lowered as the ON time is extended.

Further, it is also possible to eliminate the idle time stated above through extended ON time and shortened OFF time. In this case, the oscillation frequency is either changed or not changed depending on the rate of extension of ON time and the rate of shortening of OFF time.

As stated above, the invention makes it possible to provide an electronic flash device capable of eliminating idle time and of charging at high speed by adjusting an OFF period of control signals, while conducting step-up operations at high conversion efficiency through a flyback system.
(Second embodiment)

Next, another embodiment will be explained as follows, referring to FIG. 17. Now, the only points differing from the first embodiment will be explained. The numeral 50 represents a pulse detecting section which detects flyback pulses on one end of the secondary coil of flyback transformer T, and it is composed of a diode and a voltage dividing resistance, and results of detection of flyback pulses are supplied to CPU 1.

FIG. 18 shows the circuit structure of the similar electronic flash device wherein pulse detecting section 50 is detecting flyback pulses on one end of the primary coil of flyback transformer T.

Operations of the electronic flash device of the present embodiment are the same as those explained with reference to FIG. 2 and FIGS. 3(a)–3(f) in the first embodiment, and when charging advances and voltage in the main capacitor 40 becomes higher, a period contributing to no charging is increased. Namely, a period following the generation of flyback pulses which is immediately after the moment when the switching element 30 enters the state of interruption represents the idle time which contributes neither to charging of the main capacitor nor to accumulation of energy in the flyback transformer.

Therefore, under this state, pulse detecting section 50 detects that flyback pulses are generated, and a period from generation to extinction of flyback pulses and the time span of OFF for control signals are made to be mostly the same each other, with regard to the control signals generated from CPU 1 which received the results of detection.

In this case, any of the following cases represents that a period from generation to extinction of flyback pulses and the time span of OFF for control signals are made to be mostly the same each other.
(1) The time span for ON remains the same and the time span for OFF is shortened.
(2) The time span for ON is extended and the time span for OFF is shortened.
(3) The time span for ON is extended and the time span for OFF remains the same.

When the aforesaid item (1) is employed, it is possible to attain only by increasing the OFF time during the period from the start of charging to the completion of charging, which is preferable. In particular, when trying to employ the item (3), the ON time also needs to be increased. Since the roles (operations) of the ON time and the OFF time are represented respectively by "to accumulate energy in the transformer within the ON time" and "to release, within the OFF time, as charging current the energy accumulated in the transformer", what the ON time is increased is on the assumption that energy accumulated in the transformer can be increased accordingly. This lowers the degree of freedom for the circuit design. Further, when the ON time is increased excessively, there is a possibility that battery voltage drops rapidly within one time of ON.

In the case of the item (2), for example, when the step of time setting is only 1 $\mu$s on occasion to establish the time ratio of ON and OFF to a certain percentage, it is sometimes judged to be appropriate in terms of circuit design to change the ON time slightly in addition to the change of the OFF time. Thus, the item (2) is also preferable in terms of the degree of freedom in circuit design.

EXAMPLE

When it is assumed that the duty ratio of 58% is taken after the setting of ON:10 $\mu$s and OFF:8 $\mu$s (duty ratio: 55.6%) when changing the time as charging voltage rises, the setting of ON:11 $\mu$s and OFF:8 $\mu$s (duty ratio: 57.9%) with the changed ON time is closer to the desired setting than the setting of ON:10 $\mu$s and OFF:7 $\mu$s (duty ratio: 58.8%).

It is possible to conduct rapid charging by preventing generation of idle time and by controlling so that the number of flyback pulses generated within a specified period may be increased or they may be made greater. In this case, consumption current grows as charging advances, but the oscillation transistor is turned on after extinction of the flyback pulses. Therefore, it is possible to conduct charging while keeping high conversion efficiency, without having the control that the oscillation transistor is turned on when charging current is flowing.

FIG. 12 shows the circuit structure of an electronic flash device, and it shows the details wherein flyback pulses are detected by pulse detecting section 50 on one end of the primary coil of flyback transformer T.

Here, transistor 51 is turned on in the course of charging, and voltage of the portion which is voltage-divided with resistances 52 and 53 is subjected to A/D conversion and is monitored by pulse detecting section 50. The pulse detecting section 50 detects the fall of the input voltage ((1) in the diagram) and outputs signals which urges the switching element 30 to be turned on to CPU 1.

Incidentally, when the duty ratio of the switching element 30 is made to be too great with high charging voltage in the vicinity of completion of charging while keeping controlling so that the time span for the switching element 30 to be turned off may be mostly the same as a period from generation to extinction of flyback pulses, a large amount of currents are inputted in a charging circuit. Therefore, the switching element 30 and other electronic parts generate heat to create the state of overheat. Efficiency of step up charging is lowered by power loss caused by this heat, and furthermore, if the overheat state goes on further, there is a possibility that the safety operation zone of the switching element 30 is exceeded and an element is damaged.

In the present embodiment, therefore, it is possible to prevent the phenomenon like that stated above by maintaining the time span of on/off signals after the duty ratio of on/off time for control signals to be supplied to the switching element 30 arrives at the prescribed duty ratio. For example, under the normal condition, 65% is established as an upper limit of the duty ratio.

(Third embodiment)

FIG. 13 is a structure diagram showing the first structure of the electronic flash device in the third embodiment of the invention.

In the aforesaid electronic flash device, what is different from the electronic flash device shown in FIG. 17 is that table 60 is provided. The table 60 is one which stores therein data of ON time and OFF time for the switching element 30, and it is address-selected in accordance with the time elapsed from the start of charging and with charging voltage for the main capacitor, and the storage of data therein is in the order in which control signals to the switching element 30 are switched.

FIG. 14 shows an example of contents of the table wherein ON time and OFF time of the switching element 30 are stored in the address thereof which is selected in accordance with the time elapsed from the start of charging. As shown in FIG. 4 which has already been explained, the idle time can be cut down by reducing OFF time as time goes by from the start of charging. Therefore, the data relating to that aspect are stored in the table.

In the case of the electronic flash device equipped with table 60 like that stated above, CPU 1 sets, on a timer counter, an initial value "0" and "0.2 sec" which is the time for timing of switching next control signals, then, starts the timer, and outputs control signals for the switching element 30 by referring to on/off time stored in the first address of the table, to start charging. This timer counter is structured so that it is possible for the timer counter to measure the time elapsed from the start of timer and to invert any flag when a prescribed timer value set in advance is measured, and thereby to detect progress of a prescribed time from the program.

Therefore, CPU 1, when detecting the flag inversion of the progress of 2 sec, resets on the timer a value of 0.5 sec which is the time for timing of switching the following control signals, and switches the control signal to be outputted to the switching element 30, referring to the data of on/off time stored in the address with an increment in the table 60.

Thus, CPU 1 operates to read from the table 60 the data in the address corresponding to the time elapsed, each time the progress for the prescribed time from the start of timer is detected, and to switch control signals to the switching element 30.

Incidentally, with regard to data to be stored in the table 60, data which eliminate idle time by turning the switching element 30 on and off are obtained in advance by the use of the circuit shown in the first embodiment, and these data may be stored.

As stated above, it is possible to increase the number of flyback pulses generated within a specified period, by preparing control signals with charging time serving as a parameter and by controlling to eliminate idle time. It is therefore possible to conduct rapid charging by increasing charging current. Though an electric current from a power supply battery is increased because the duty ratio is enlarged slightly in this case, the state of charging at high conversion efficiency can be maintained.

Incidentally, data shown in FIG. 14 is only an example, and it is also possible to divide charging time more finely so that more data may be stored.

FIG. 15 is a structure diagram showing the second structure of the electronic flash device in the third embodiment of the invention. As shown in FIG. 15, battery voltage detecting section 70 is provided, and data shown in FIG. 16(a) are stored in the table 60.

In this case, when battery voltage detected at the battery voltage detecting section 70 is on the ordinary level (in the case of ordinary time), CPU 1 controls the time span ranging from ON 10 and OFF 50 to ON 10 and OFF 7 in accordance with the table shown in FIG. 16(a).

When battery voltage detected at the battery voltage detecting section 70 is on the low level (in the case of low voltage), CPU 1 controls the time span ranging from ON 10 and OFF 50 to ON 10 and OFF 8 in accordance with the table shown in FIG. 16(b) wherein an address is shifted in the direction where the rate of ON time is made smaller.

With regard to shifting of an address of the charging time corresponding to battery voltage stated above, data of address to which a shifting value corresponding to battery voltage is added can be read out to the address corresponding to the charging time (charging voltage).

As stated above, it is possible to conduct highly efficient charging without burdening a battery having weakened electromotive force, by shifting the address of the table with battery voltage, when preparing control signals with charging time serving as a parameter and when controlling to eliminate idle time.

In this case, more appropriate control can be conducted by detecting the battery voltage at plural steps, and by shifting the address at plural steps.

Incidentally, in the case of electronic flash charging under the condition of low temperature environment or of a battery having shorter remaining life, when trying to draw out a large amount of current from the battery, the electromotive force drops sharply, and charging time is extended on the contrary. Even if the charging is completed, there is a possibility that the battery voltage is lowered at that moment of completion to the level which is not sufficient to operate other circuits of a camera.

By detecting the battery voltage, it is possible to discriminate the low temperature environment and the battery with shorter remaining life from the normal temperature and the battery having sufficient remaining life.

In the present embodiment, therefore, it is possible to control to the current consumption corresponding to the state of a battery, by maintaining the time span for on/off signals when the duty ratio of on/off time for control signals to be supplied to the switching element 30 arrives at the prescribed duty ratio established in accordance with the battery voltage. In this case, it is possible to set as shown in FIG. 16(c), if a 3V lithium battery is taken as an example.

FIG. 17 is a structure diagram showing the third structure of the electronic flash device in the third embodiment of the invention. As shown in FIG. 17, charging voltage detecting section 80 which detects charging voltage for the main capacitor 40 is provided, and table 60 storing therein the data whose address is charging voltage shown in FIG. 18 is provided.

In this case, charging voltage for the main capacitor 40 is measured by the voltage detecting section 80, and CPU 1 generates control signals for the switching element 30, referring to ON time and OFF time which are read out when the results of measurement by the voltage detecting section 80 are given as an address.

Namely, in the case of the electronic flash device equipped with this table 60, CPU 1 first detects the charging voltage for the main capacitor through A/D conversion. Then, it establishes a value of charging voltage to which the control signal for the switching element 30 is to be switched next from the detected charging voltage to comparing voltage of comparing mode, then, refers, from the table 60, to on/off time stored in the address corresponding to the detected charging voltage, and outputs the control signal for the switching element 30, start charging. This comparing mode is of the structure wherein voltage inputted in A/D conversion input terminal is compared in terms of height with comparing voltage established in advance, and a certain flag is set or rest depending on the results of the comparison, thus, the results of the comparison in terms of height between the two voltages can be detected from the program.

Therefore, CPU 1, once it detects flag inversion, establishes a value of charging voltage whose control signal is to be switched next, as comparing voltage in the comparing mode, and switches the control signal to be outputted to the switching element 30, referring to data of on/off time stored in the incremental address of the table 60.

As stated above, CPU 1, each time it detects flag inversion, reads data on the address corresponding to the charging voltage out of the table 60, and switches control signals to the switching element 30.

Incidentally, with regard to data to be stored in the table 60, data which eliminate idle time by turning the switching element 30 on and off are obtained in advance by the use of the circuit shown in the second embodiment, and these data may be stored.

As stated above, it is possible to increase the number of flyback pulses generated within a specified period, by preparing control signals with charging voltage of the main capacitor 40 serving as a parameter and by controlling to eliminate idle time. It is therefore possible to conduct rapid charging by increasing charging current. Though an electric current from a power supply battery is increased because the duty ratio is enlarged slightly in this case, the state of charging at high conversion efficiency can be maintained.

Incidentally, data shown in FIG. 18 is only an example, and it is also possible to divide charging time more finely so that more data may be stored.

(Fourth embodiment)

FIG. 19 is a structure diagram showing the basic structure of the electronic flash device in the fourth embodiment of the invention.

What is different from the electronic flash device shown in the embodiment stated above is that temperature measuring section 90 is provided. This temperature measuring section 90 is one to measure ambient temperature, and it especially measures temperature inside the electronic flash device, while it preferably measures temperature in the vicinity of the base plate for electronic flash.

Namely, in the electronic flash device, control is conducted so that at least one of time spans for ON and OFF for the switching element 30 may be changed in accordance with a period from generation to extinction of the flyback pulse generated on the secondary coil, referring to the measured ambient temperature.

Incidentally, in the case of charging for electronic flash in continuous charging operations under the condition of high temperature ambient or continuous photographing, overheat takes place gradually because electronic parts can not release heat. If such state continues, there is a possibility that parts may be damaged by heat.

In the present embodiment, therefore, temperature in side a camera or temperature on the base plate for electronic flash each for electronic flash charging is detected, and when the detected temperature exceeds the prescribed temperature and the duty ratio of on/off time for control signals to be supplied to the switching element 30 arrives at, or is exceeding the duty ratio established in advance, the control is switched to the charging control of low consumption current which generates no heat by switching the control to on/off time established in advance. Thus, overheat of electronic parts can be prevented.

For example, when the base plate temperature is detected to be 100° C. or more and the duty ratio of on/off time for control signals to be supplied to the switching element 30 exceeds 33%, ON time for the control signal is set to 10 $\mu$s and OFF time is set to 20 $\mu$s.

FIG. 21 is a structure diagram showing the second structure of the electronic flash device in the fourth embodiment of the invention. As shown in FIG. 21, charging voltage detecting section 80 is provided, and data shown in FIGS. 22(a) and 22(b) are stored in the table 60, and temperature measuring section 90 is further provided.

When the ambient temperature is within an ordinary range, CPU 1 controls the time span for switching in accordance with the table in FIG. 22(a). When the ambient temperature is out of an ordinary range to be lower or higher, CPU 1 controls the time span for switching in accordance with the table in FIG. 22(b) wherein the address is shifted in the direction to make the rate of ON time small.

When controlling in the direction to eliminate idle time, by preparing control signals with charging voltage detected by charging voltage detecting section 80 serving as a parameter, it is possible to conduct highly efficient charging without burdening a battery or a circuit, by shifting the address in the table with ambient temperature.

In this case, more optimum charging can be conducted by detecting the ambient temperature at plural steps, and by shifting the address at plural steps.

The structure wherein an address is shifted like this makes it possible to read out data for appropriate terms in accordance with conditions and thereby to conduct the control without rewriting the table.

Further, it is possible to use a circuit shown in FIG. 2 as the third structure of the electronic flash device in the fourth embodiment of the invention.

In this case, when the ambient temperature measured by temperature measuring section 90 is on the ordinary level (in the case of ordinary temperature), CPU 1 controls on/off time in accordance with the table in FIG. 23(a).

When the ambient temperature measured by temperature measuring section 90 is on the level which is out of an ordinary range (in the case of temperature which is out of an ordinary one), CPU 1 controls on/off time in accordance with the table in FIG. 23(b) wherein an address is shifted in the direction to make the rate of ON time small.

With regard to the address shifting for charging time corresponding to the ambient temperature, data on the address wherein a shifting value corresponding to ambient temperature is added to the address corresponding to charging time may be read out.

As stated above, when controlling in the direction to eliminate idle time by preparing control signals with charging time serving as a parameter, it is possible to conduct rapid charging at high conversion efficiency without burdening a battery or a circuit, by shifting an address of the table with ambient temperature.

In this case, more optimum charging can be conducted by detecting ambient temperature at plural steps and thereby by shifting the address at plural steps.

The structure wherein the address is shifted as stated above makes it possible to control by reading out data of appropriate items in accordance with conditions, without rewriting the table.

(Fifth embodiment)

Further, CPU 1 refers to the emission time (emission time=0 when electronic flash is not used) for electronic flash of the immediately preceding photographing, and generates control signals corresponding to that emission time for electronic flash.

Incidentally, each of FIGS. 24(a) and 24(b) shows relationship between the emission time and the residual voltage of the main capacitor estimated from that emission time. In this case, FIG. 24(a) shows emission waveform and FIG. 24(b) shows the residual voltage. With regard to the relation among emission time, residual voltage of the main capacitor and the initial value of the timer to be set, in this case, it can be set as shown in FIG. 25, as an example.

(Sixth embodiment)

Incidentally, in an electronic flash device, CPU 1 monitors the state of operations of each part of a camera, then monitors existence of some operation or other of each part of the camera, and discontinues charging of the main capacitor when any operation of the camera exists. Then, CPU 1 maintains the results of measurement for the charging time at the point of time of the discontinuation of charging, and it controls to resume charging for the period following the point of time for the results of measurement thus maintained, when the aforesaid operation of the camera has been completed.

As stated above, it is possible to deal with small-sized battery 10 representing power supply for a camera, by discontinuing charging electronic flash device temporarily when some operation or other (zoom operation) of a camera exists. Further, since charging for electronic flash can be resumed to follow the state of discontinuation, it is possible to resume charging in the state suitable for the charging voltage of the main capacitor and various conditions, thus, rapid charging can be conducted at high conversion efficiency.

Incidentally, in this case, CPU 1 discontinues charging for electronic flash in the case of operations of a camera requiring a certain amount of current, and it does not need to discontinue when actions or operations hardly require an electric current.

(Seventh embodiment)

Incidentally, in the electronic flash device, when battery 10 has its capacity to be used under the normal condition, charging can be completed within a certain charging time (for example, 3–4 sec). However, this charging time is sometimes extended for the reasons such as a battery having weakened electromotive force, a battery having lowered electromotive force under low temperature, an increase of continuity loss caused by overheat of a switching element, and enhancement of internal resistance (temperature fuse) caused by battery heat generation.

Therefore, a table having contents shown in FIG. 26 is prepared, and when the charging time measured by a timer built in CPU 1 exceeds a prescribed value (for example, 4 seconds), control signals of the span of prescribed on/off time for reducing an electric current are supplied to control input terminal of the switching element 30.

Due to this, it is possible to conduct charging at high speed in the case of an ordinary battery, and it is possible to lighten load of each part and thereby to continue charging, when the charging time is extended by some reason or other as stated above.

The longer the charging time is, the greater the degree of abnormality is, and therefore, if the duty ratio is lowered in inverse proportion to the charging time as shown in FIG. 27, the load can further be lightened and charging can be continued.

When the charging time is extended for some reason or other, it is also possible to control so that an electric current may be reduced within the first prescribed time elapsed, and the electric current may be interrupted within the second prescribed time elapsed which is longer the first time elapsed.

Even in this case, when the charging time is further extended abnormally when lightening load of each part and thereby continuing charging, there can be conducted the control to maintain other functions as a camera through shutdown of the electric current.

As stated above, appropriate control can be conducted even when no detecting means to grasp the state of charging for electronic flash is used, or by judging the state of charging for electronic flash which is difficult to detect if the detecting means is used.

(Other embodiment)

Incidentally, though the invention of the electronic flash devices have been explained in the aforesaid embodiment, a camera equipped with any of the electronic flash devices stated above is also an embodiment of the invention.

Namely, in the camera equipped with an electronic flash device in each embodiment above, it is possible to conduct rapid charging as well as charging under the state determined in accordance with various conditions, while keeping step up operations at high conversion efficiency as stated above.

As explained above, the present invention makes it possible to materialize an electronic flash device capable of charging under the appropriate state, referring to various conditions, while conducting step up operations at high conversion efficiency.

What is claimed is:

1. An electronic flash charging apparatus having an electronic flash charging circuit of a separate excitation oscillating, comprising:
    a flyback transformer, having at least a primary coil and a secondly coil;
    a switching element for turning on or off electric power, to be supplied to said primary coil, based on control signals supplied to a control input terminal;
    a rectifying diode for rectifying a flyback pulse generated on said secondly coil when said switching element is changed from ON state, that said electric power is turned on, to OFF state, that said electric power is turned off;
    a main capacitor for charging a current rectified by said rectifying diode; and
    an oscillation controller for generating control signals for changing at least one of time spans of ON state and OFF state of said switching element in accordance with a period from generation to extinction of said flyback pulse generated on said secondly coil, and for supplying said control signals to said control input terminal of said switching element.

2. The electronic flash charging apparatus of claim 1, wherein said oscillation controller generates said control signals which change time span of said OFF state of said switching element in accordance with a period from generation to extinction of said flyback pulse generated on said secondly coil.

3. The electronic flash charging apparatus of claim 1, wherein said oscillation controller generates said control signals which control time span of said OFF state of said switching element to be made substantially the same as a period from generation to extinction of said flyback pulse generated on said secondly coil.

4. The electronic flash charging apparatus of claim 1, comprising: a charging voltage detector for detecting charging voltage of said main capacitor;

wherein said oscillation controller generates said control signals in accordance with said charging voltage of said main capacitor detected by said charging voltage detector.

5. The electronic flash charging apparatus of claim 1, comprising: a timer means for starting measurement of time when said main capacitor is started to be charged;

wherein said oscillation controller generates said control signals in accordance with a result of said measurement of time by the timer.

6. The electronic flash charging apparatus of claim 5, comprising: a battery voltage detector for detecting voltage of a power supply battery;

wherein said oscillation controller changes relationship between said result of measurement of time by said timer means and said control signals in accordance with said battery voltage detected by said battery voltage detector.

7. The electronic flash charging apparatus of claim 1, wherein said switching element is capable of being driven by a voltage lower than that by which said oscillation controller is driven, and said switching element is a voltage control element having ON resistance lower than a sum total of internal resistance of said power supply battery and line resistance of power supply from said power supply battery.

8. The electronic flash charging apparatus of claim 1, comprising: a power supply capacitor connected with a power supply battery in parallel;

wherein said power supply capacitor has an impedance lower than a sum total of internal resistance of said power supply battery and line resistance of power supply from said power supply battery.

9. The electronic flash charging apparatus of claim 1, wherein said rectifying diode is an element having a small capacity between terminals.

10. The electronic flash charging apparatus of claim 1, comprising: a flyback detector for detecting a flyback pulse generated on said secondary coil;

wherein said oscillation controller generates said control signals in accordance with a result of detection conducted by said flyback detector.

11. The electronic flash charging apparatus of claim 10, wherein said oscillation controller generates said control signals for changing at least one of time spans of said ON state and said OFF state of said switching element in accordance with a period from generation to extinction of said flyback pulse generated on said secondary coil detected by said flyback detector.

12. The electronic flash charging apparatus of claim 10, wherein said oscillation control device generates said control signals which control, in accordance with said period during said flyback pulse is being generated, a time span of said OFF state of the switching element to be made substantially the same as a period from generation to extinction of said flyback pulse.

13. The electronic flash charging apparatus of claim 10, wherein said flyback detector detects generation of a flyback pulse by voltage of said primary coil.

14. The electronic flash charging apparatus of claim 1, wherein said oscillation controller maintains time spans of on/off signals which said control signals have, to be supplied to said control input terminal, when a duty ratio of said on/off signals arrives at a predetermined value wherein said on/off signals are for making the switching element switched between said ON state and said OFF state.

15. The electronic flash charging apparatus of claim 1, comprising: a battery voltage detector for detecting voltage of a power supply battery;

wherein said oscillation controller maintains a time span of on/off signals, supplied to said control input terminal, when a duty ratio of said on/off signals, which said control signals have, arrives at a predetermined value established in accordance with battery voltage detected by said battery voltage detector, wherein said on/off signals are for making the switching element switched between said ON state and said OFF state.

16. The electronic flash charging apparatus of claim 1, comprising: a battery voltage detector for detecting voltage of a power supply battery;

wherein said oscillation controller generates said control signals in accordance with results of detection conducted by said battery voltage detector.

17. The electronic flash charging apparatus of claim 1, comprising: a temperature measuring means for measuring temperature inside a camera;

wherein said oscillation controller maintains a time span of on/off signals, which said control signals have, supplied to said control input terminal when said temperature measuring means detects that a temperature in said camera arrives at a predetermined temperature and a duty ratio of said on/off signals arrives at a predetermined value, wherein said on/off signals are for making the switching element switched between said ON state and said OFF state.

18. The electronic flash charging apparatus of claim 1, comprising: a timer for starting measurement of time when said main capacitor is started to be charged;

wherein said oscillation controller generates, in accordance with results of measurement by said timer, said control signals for changing at least one of time spans of said ON state and said OFF state of said switching element in accordance with a period from generation to extinction of said flyback pulse generated on said secondary coil.

19. The electronic flash charging apparatus of claim 18, wherein said oscillation controller sets an elapsed time, corresponding to a remaining voltage of said main capacitor, as an initial value of said timer in accordance with an emission time of an electronic flash for a preceding emission of said electronic flash.

20. The electronic flash charging apparatus of claim 18, wherein said oscillation controller conducts an interruption of charging of said main capacitor when a predetermined operation is performed in a camera; said oscillation controller maintains said results of measurement conducted by said timer when said interruption is made; and said oscillation controller resumes charging of said main capacitor after completion of said predetermined operation in a camera from a state that said results of measurement are maintained.

21. The electronic flash charging apparatus of claim 18, wherein said oscillation controller supplies said control signals, having said time spans of said ON sate and said OFF state for reducing a current, to said control input terminal when said result of measurement by said timer arrives at a predetermined time.

22. The electronic flash charging apparatus of claim 18, wherein said oscillation controller generates said control signals, having said time spans of said ON state and said OFF state for reducing a current, to said control input terminal when said result of measurement by said timer exceeds a first predetermined time; and said oscillation controller generates said control signals for cutting off said current when said result of measurement by said timer exceeds a second predetermined time which is longer than said first predetermined time.

23. An electronic flash apparatus of a separate excitation oscillating type, comprising:
- a flyback transformer, having at least a primary coil and a secondary coil;
- a switching element for turning on and off electric power, to be supplied to said primary coil, based on control signals on a control input terminal;
- a rectifying diode for rectifying a flyback pulse generated in said secondly coil when said switching element is changed from ON state, that said electric power is turned on, to OFF state, that said electric power is turned off;
- a main capacitor for charging a current rectified by said rectifying diode;
- an oscillation controller for generating control signals for changing from said ON state to said OFF state or said OFF state to said ON state of said switching element and for supplying said control signals to said control input terminal of said switching element;
- a charging voltage detector for detecting a charging voltage of said main capacitor; and
- a storing means for storing data of said control signals, determined for respective charging voltage, in each accessible address based on results of detection by said charging voltage detector;
- wherein said oscillation controller reads said data from an address selected in accordance with results of detection by said charging voltage detector when said main capacitor is being charged; and said oscillation controller outputs said data as said control signals.

24. The electronic flash apparatus of claim 23, comprising: a battery voltage detector for detecting voltage of a power supply battery;
- wherein said oscillation controller changes said address, selected in accordance with results of detection by said charging voltage detector when said main capacitor is being charged, to other address in accordance with battery voltage detected by said battery voltage detector; and said oscillation controller reads data from said other address and outputs said data as control signals.

25. An electronic flash device of a separate excitation oscillating type, comprising:
- a flyback transformer, having at least a primary coil and a secondary coil;
- a switching element for turning on and off electric power, to be supplied to said primary coil, based on control signals on a control input terminal;
- a rectifying diode for rectifying a flyback pulse generated in said secondly coil when said switching element is changed from ON state, that said electric power is turned on, to OFF state, that said electric power is turned off;
- a main capacitor for charging a current rectified by said rectifying diode;
- a timer means for starting measurement of time when said main capacitor is started to be charged;
- a storing means for storing data of said control signals, determined for respective time, in each accessible address based on results of measurement of time by said timer means; and
- an oscillation controller for supplying control signals for changing from said ON state to said OFF state or said OFF state to said ON state of said switching element;
- wherein said oscillation controller reads data from an address selected in accordance with results of measurement of time by said timer; and said oscillation controller outputs said data as control signals.

26. The electronic flash apparatus of claim 25, comprising: a battery voltage detector for detecting voltage of a power supply battery;
- wherein said oscillation controller changes said address, selected in accordance with result of measurement of time by said timer means, to other address in accordance with said battery voltage detected by said battery voltage detector; and said oscillation controller reads data from said other address and outputs said data as control signals.

27. A camera, comprising:
- an electronic flash charging apparatus having an electronic flash charging circuit of a separate excitation oscillating, including:
  1) a flyback transformer, having at least a primary coil and a secondly coil;
  2) a switching element for turning on or off electric power, to be supplied to said primary coil, based on control signals supplied to a control input terminal;
  3) a rectifying diode for rectifying a flyback pulse generated on said secondly coil when said switching element is changed from ON state, that said electric power is turned on, to OFF state, that said electric power is turned off;
  4) a main capacitor for charging a current rectified by said rectifying diode; and
  5) an oscillation controller for generating control signals for changing at least one of time spans of ON state and OFF state of said switching element in accordance with a period from generation to extinction of said flyback pulse generated on said secondly coil, and for supplying said control signals to said control input terminal of said switching element.

28. The camera of claim 27, wherein said oscillation controller maintains time spans of on/off signals which said control signals have, to be supplied to said control input terminal, when a duty ratio of said on/off signals arrives at a predetermined value wherein said on/off signals are for making the switching element switched between said ON state and said OFF state.

* * * * *

UNITED STATES PATENT AND TRADEMARK OFFICE
CERTIFICATE OF CORRECTION

PATENT NO. : 6,219,493 B1
DATED : April 17, 2001
INVENTOR(S) : Toshiyuki Aoki et al.

It is certified that error appears in the above-identified patent and that said Letters Patent is hereby corrected as shown below:

Column 24,
Lines 35, 40, 50, 58 and 64, "secondly" should read -- secondary --.

Column 26,
Line 54, "ON sate" should read -- On state --.

Column 27,
Lines 9 and 51, "secondly" should read -- secondary --.

Column 28,
Lines 30, 35 and 46, "secondly" should read -- secondary --.

Signed and Sealed this

Seventh Day of May, 2002

Attest:

*Attesting Officer*

JAMES E. ROGAN
*Director of the United States Patent and Trademark Office*